(12) United States Patent
Kim et al.

(10) Patent No.: US 11,159,925 B2
(45) Date of Patent: Oct. 26, 2021

(54) METHOD AND APPARATUS FOR TRANSMITTING V2X DATA IN WIRELESS COMMUNICATION SYSTEM

(71) Applicant: LG Electronics Inc., Seoul (KR)

(72) Inventors: Laeyoung Kim, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 16/406,761

(22) Filed: May 8, 2019

(65) Prior Publication Data

US 2019/0349730 A1 Nov. 14, 2019

(30) Foreign Application Priority Data

| | | | |
|---|---|---|---|
| May 8, 2018 | (KR) | ......................... | 10-2018-0052506 |
| Sep. 28, 2018 | (KR) | ......................... | 10-2018-0116271 |
| Nov. 19, 2018 | (KR) | ......................... | 10-2018-0142679 |

(51) Int. Cl.

| | |
|---|---|
| *H04W 4/40* | (2018.01) |
| *H04W 80/02* | (2009.01) |
| *H04W 76/27* | (2018.01) |
| *H04W 76/14* | (2018.01) |
| *H04W 88/02* | (2009.01) |
| *H04W 76/11* | (2018.01) |

(52) U.S. Cl.
CPC .............. *H04W 4/40* (2018.02); *H04W 76/11* (2018.02); *H04W 76/14* (2018.02); *H04W 76/27* (2018.02); *H04W 80/02* (2013.01); *H04W 88/023* (2013.01)

(58) Field of Classification Search
None
See application file for complete search history.

(56) References Cited

U.S. PATENT DOCUMENTS

| | | |
|---|---|---|
| 2017/0093541 A1 | 3/2017 | Pan et al. |
| 2018/0206089 A1* | 7/2018 | Cavalcanti ........ H04W 36/0083 |

(Continued)

FOREIGN PATENT DOCUMENTS

| | | |
|---|---|---|
| WO | WO2014209077 | 12/2014 |
| WO | WO2017191973 | 11/2017 |
| WO | WO2018016157 | 1/2018 |

OTHER PUBLICATIONS

Ericsson, "Layer-2 Protocol Stack for PC5-based V2X," R2-165524, 3GPP TSG-RAN WG2 #95, Gothenburg, Sweden, Aug. 22-26, 2016, 6 pages.

(Continued)

*Primary Examiner* — Mohammad S Adhami

(74) *Attorney, Agent, or Firm* — Fish & Richardson P.C.

(57) ABSTRACT

A method for transmitting, by a first user equipment (UE), V2X data to a second UE in a wireless communication system, the method comprising: broadcasting, by the first UE, a Direct Communication Request message; receiving, in a unicast manner, a Direct Communication Accept message from the second UE receiving the Direct Communication Request message; and transmitting data of a V2X service to the second UE in a unicast manner, wherein the source Layer-2 identity (ID) included in the broadcast Direct Communication Request message is used as a destination Layer-2 ID of the Direct Communication Accept message for unicast reception of the data of the V2X service by the second UE, is disclosed.

13 Claims, 19 Drawing Sheets

(56) References Cited

U.S. PATENT DOCUMENTS

2018/0365909 A1\* 12/2018 Cheng ............... G07C 5/008
2019/0287317 A1\* 9/2019 Christen .............. G01S 7/41
2020/0351966 A1\* 11/2020 Karampatsis ......... H04W 76/11

OTHER PUBLICATIONS

ZTE, Huawei, "Miscellaneous corrections on V2V," R2-168934, 3GPP TSG-RAN WG2 #96, Reno, USA, Nov. 14-18, 2016, 8 pages.
EP Extended European Search Report in European Appln. No. 19799655.6, dated Mar. 9, 2021, 11 pages.

\* cited by examiner

METHOD AND APPARATUS FOR TRANSMITTING V2X DATA IN WIRELESS COMMUNICATION SYSTEM

CROSS-REFERENCE TO RELATED APPLICATIONS

This application claims the benefit of Korean Application No. 10-2018-0052506, filed on May 8, 2018, Korean Application No. 10-2018-0116271, filed on Sep. 28, 2018, and Korean Application No. 10-2018-0142679, filed on Nov. 19, 2018. The disclosures of the prior applications are incorporated by reference in their entirety.

BACKGROUND OF THE INVENTION

Field of the Invention

The following description relates to a wireless communication system, and more particularly, to a method and apparatus for efficiently processing optimized PC5 transmission for V2X services.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

In the wireless communication system, various radio access technologies (RATs) such as LTE, LTE-A, and Wi-Fi are used. 5G technology is among the RATs. Three major requirement categories for 5G include (1) a category of enhanced mobile broadband (eMBB), (2) a category of massive machine type communication (mMTC), and (3) a category of ultra-reliable and low latency communications (URLLC). Some use cases may require a plurality of categories for optimization and other use cases may focus only upon one key performance indicator (KPI). 5G supports such various use cases, using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

Next, a plurality of use cases will be described in more detail.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

The health sector contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

SUMMARY OF THE INVENTION

Accordingly, the present invention is directed to a method and apparatus for transmitting V2X data in a wireless communication system that substantially obviate one or more problems due to limitations and disadvantages of the related art.

An object of the present invention lies on a method for efficiently performing unicast transmission to each of terminals desiring to receive a V2X service after performing a broadcast transmission to a plurality of terminals.

The technical objects that can be achieved through the embodiments are not limited to what has been particularly described hereinabove and other technical objects not described herein will be more clearly understood by persons skilled in the art from the following detailed description.

To achieve these objects and other advantages and in accordance with the purpose of the invention, as embodied and broadly described herein, a method for transmitting, by a first user equipment (UE), V2X data to a second UE in a wireless communication system, the method comprising: broadcasting, by the first UE, a Direct Communication Request message; receiving, in a unicast manner, a Direct Communication Accept message from the second UE receiving the Direct Communication Request message; and transmitting data of a V2X service to the second UE in a unicast manner, wherein the source Layer-2 identity (ID) included in the broadcast Direct Communication Request message is used as a destination Layer-2 ID of the Direct Communication Accept message for unicast reception of the data of the V2X service by the second UE.

In another aspect of the present invention, a first user equipment (UE) in a wireless communication system, comprising: a memory; and at least one processor coupled to the memory, wherein the at least one processor is configured to: broadcast a Direct Communication Request message; receive, in a unicast manner, a Direct Communication Accept message from a second UE receiving the Direct Communication Request message; and transmit data of a V2X service to the second UE in a unicast manner, wherein the source Layer-2 identity (ID) included in the broadcast Direct Communication Request message is used as a destination Layer-2 ID of the Direct Communication Accept message for unicast reception of the data of the V2X service by the second UE.

In another aspect of the present invention, a method for receiving V2X data by a second user equipment (UE) in a wireless communication system, the method comprising: receiving, by the second UE, a Direct Communication Request message from a first UE in a broadcast manner; transmitting, by the second UE, a Direct Communication Accept message in a unicast manner; and receiving data of a V2X service from the first UE in a unicast manner, wherein the source Layer-2 identity (ID) included in the broadcast Direct Communication Request message is used as a destination Layer-2 ID of the Direct Communication Accept message for unicast reception of the data of the V2X service by the second UE.

In another aspect of the present invention, a second user equipment (UE) in a wireless communication system, comprising: a memory; and at least one processor coupled to the memory, wherein the at least one processor is configured to: receive a Direct Communication Request message from a first UE in a broadcast manner; transmit a Direct Communication Accept message in a unicast manner; and receive data of a V2X service from the first UE in a unicast manner, wherein the source Layer-2 identity (ID) included in the broadcast Direct Communication Request message is used as a destination Layer-2 ID of the Direct Communication Accept message for unicast reception of the data of the V2X service by the second UE.

The Direct Communication Request message comprises information about the V2X service.

The Direct Communication Request message is transmitted for establishment of a V2X service oriented layer 2 link.

The Direct Communication Accept message comprises an ID of the second UE corresponding to the source Layer-2 ID.

The Direct Communication Accept message corresponds to at least one of a UE that has determined to use the V2X service, a UE that has not determined to use the V2X service but intends to receive data of the V2X service and determine whether to use the V2X service, a UE that has determined to establish an L2 link for the V2X service with the first UE, or a UE that has determined to perform unicast communication with the first UE for the V2X service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
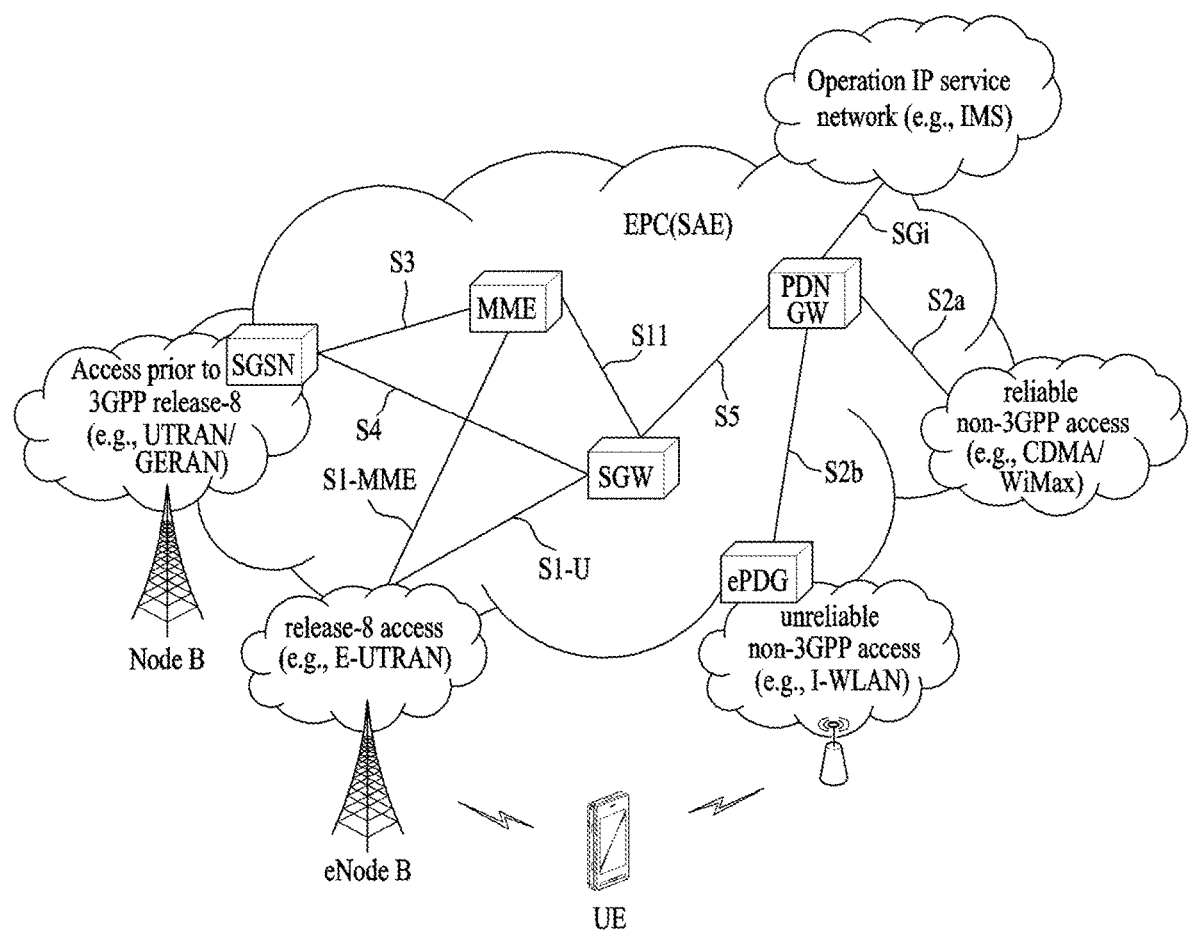
FIG. 1 is a diagram showing a schematic structure of an evolved packet system (EPS) including an evolved packet core (EPC)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is not limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |

TABLE 1-continued

| Reference point | Description |
|---|---|
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
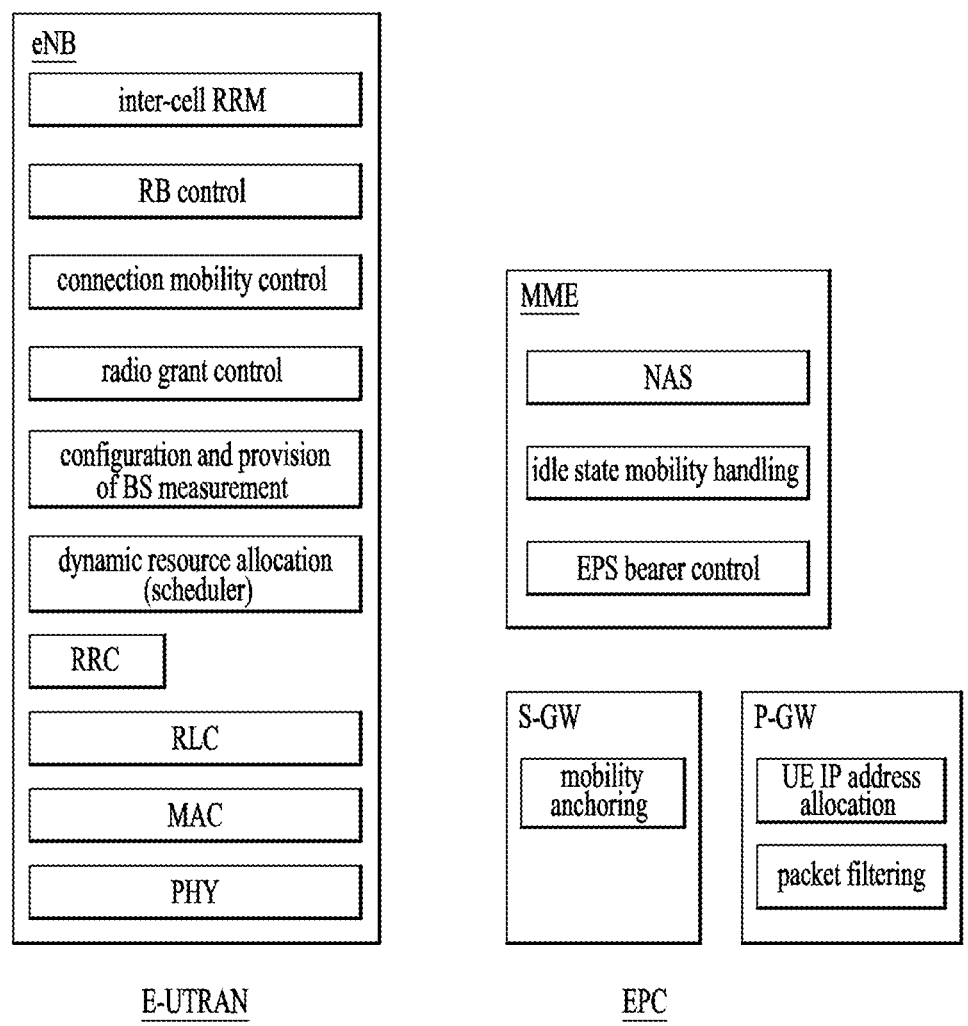
FIG. 2 is an exemplary diagram illustrating an architecture of a general E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE IDLE state management, ciphering of the user plane, SAE bearer control, and ciphering and integrity protection of NAS signaling.

Figure 3:
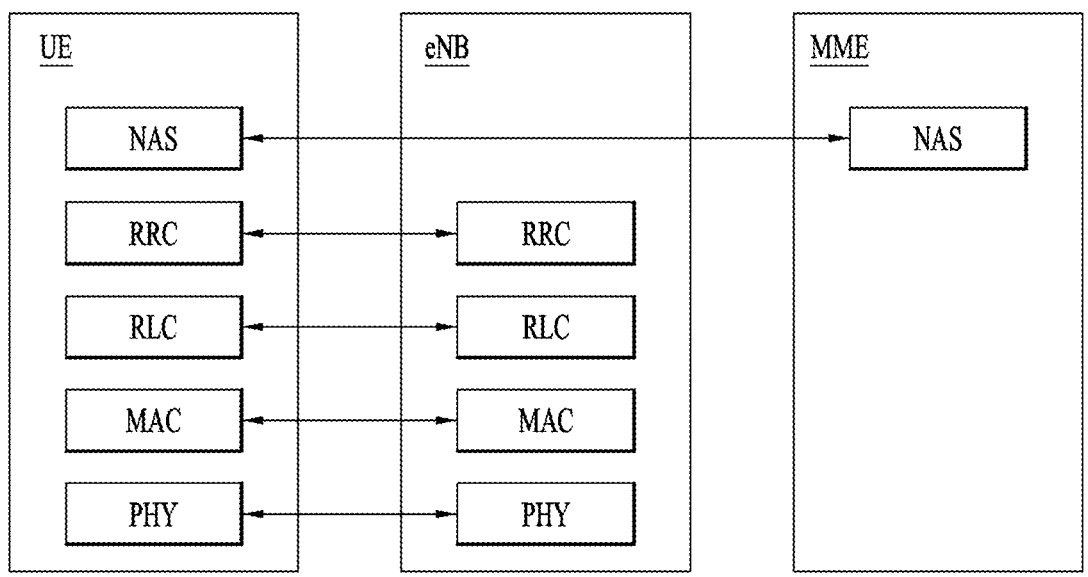
FIG. 3 is an exemplary diagram illustrating a structure of a wireless interface protocol in a control plane.
Figure 4:
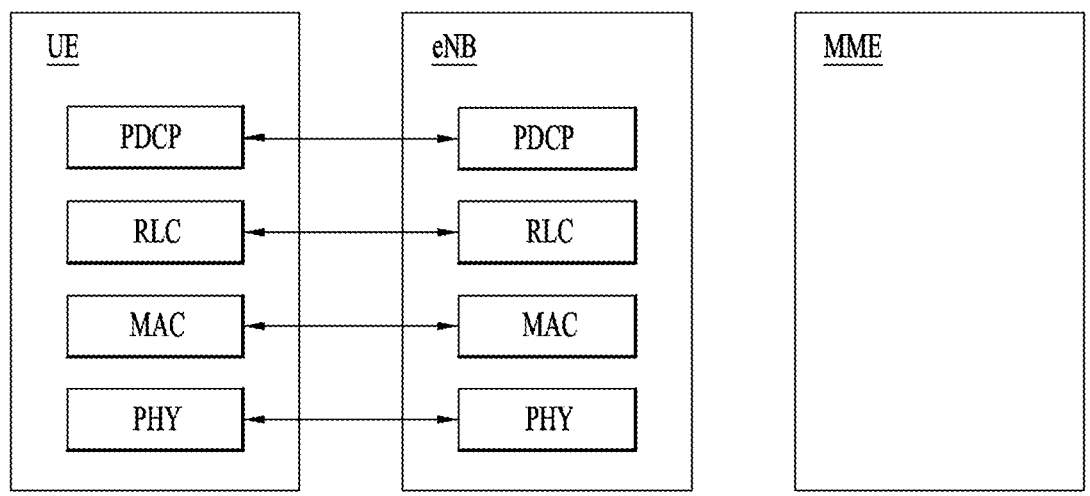
FIG. 4 is an exemplary diagram illustrating a structure of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC_connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
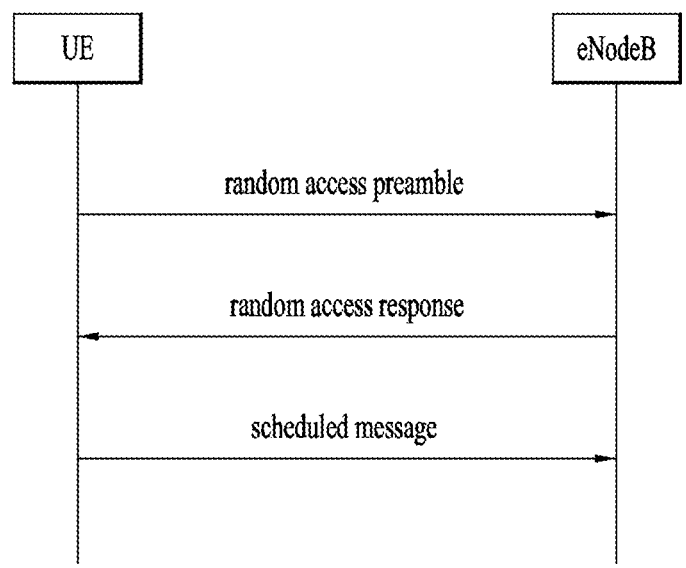
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
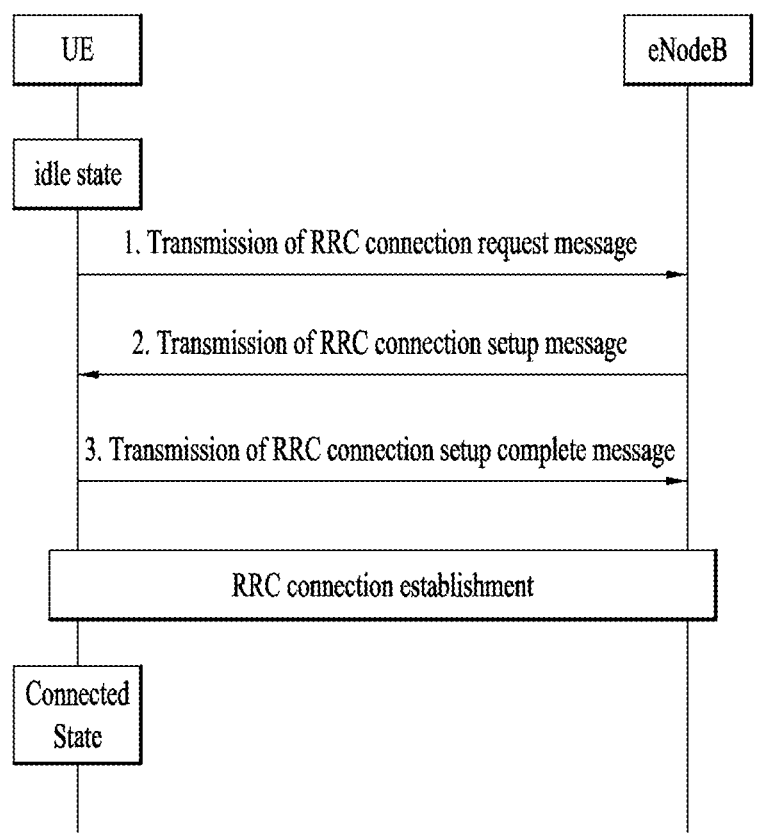
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
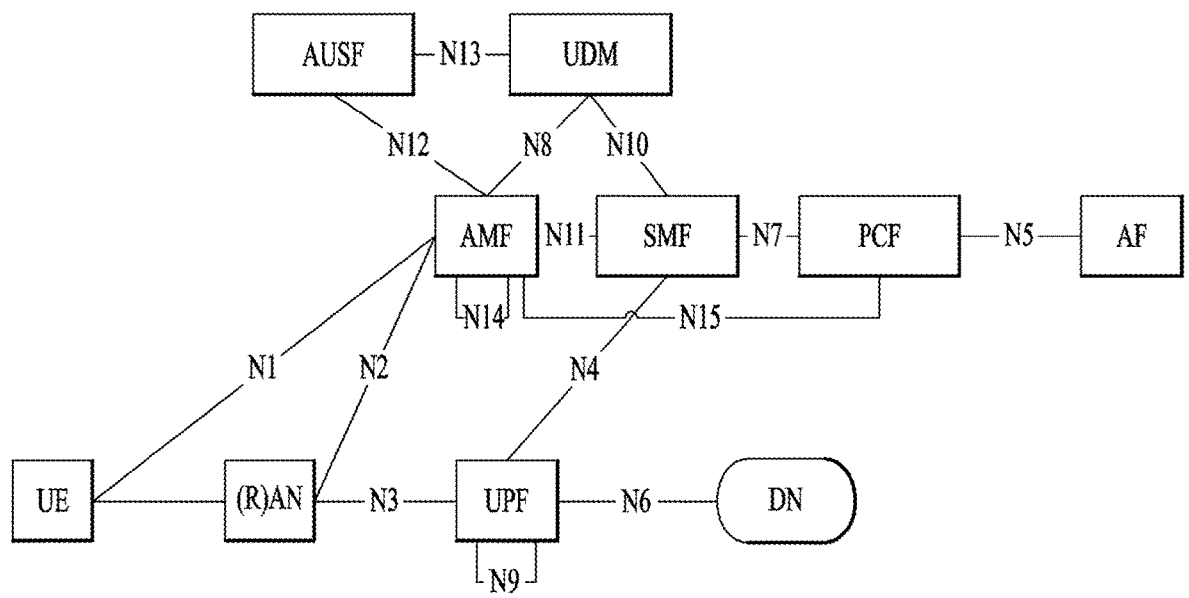
FIG. 7 is a diagram illustrating a 5G system.

The MME in the conventional EPC is divided into an Access and Mobility Management Function (AMF) and a Session Management Function (SMF) in the next generation system (or 5G Core Network (CN)). Accordingly, the NAS interaction with the UE and the mobility management (MM) are performed by the AMF, and the session management (SM) is performed by the SMF. The SMF manages a User Plane Function (UPF), which is a gateway that has a user-plane function, that is, a gateway for routing user traffic. In the conventional EPC, it may be considered that the SMF is responsible for the control plane portion of the S-GW and the P-GW and the UPF is responsible for the user-plane portion. One or more UPFs may be provided between the RAN and the Data Network (DN) for the routing of user traffic. That is, in the 5G system, the conventional EPC may be configured as illustrated in FIG. 7. In addition, in 5G system, a Protocol Data Unit (PDU) session is defined as a concept corresponding to PDN connection in the conventional EPS. The PDU session refers to an association between a UE and a DN that provides PDU connectivity services of an Ethernet type or an unstructured type as well as an IP type. In addition, Unified Data Management (UDM) performs a function corresponding to the HSS of the EPC, and PCF (Policy Control Function) performs a function corresponding to the Policy and Charging Rules Function (PCRF) of the EPC. Of course, the functions may be provided in an extended form to meet the requirements of the 5G system. For details of the 5G system architecture, functions, and interfaces, refer to TS 23.501.

Work on the 5G system is being carried out in TS 23.501, TS 23.502 and TS 23.503. Accordingly, in the present invention, the above standards are applied to the 5G system. In addition, the more detailed architecture and contents related to NG-RAN comply with TS 38.300 and the like. 5G system also supports non-3GPP access. In this regard, the architecture, network elements, and the like to support non-3GPP access are described in section 4.2.8 of TS 23.501, and procedures for supporting non-3GPP access are described in section 4.12 of TS 23.502. A typical example of non-3GPP access is WLAN access, which may include both a trusted WLAN and an untrusted WLAN. The AMF of the 5G system performs registration management (RM) and connection management (CM) for 3GPP access as well as non-3GPP access. As the same AMF serves UEs for 3GPP access and non-3GPP access belonging to the same PLMN, a single network function may integrally and efficiently support authentication, mobility management and even session management for UEs registered through two different accesses.

Section 4.2.3.3 of TS 23.502 describes an operation performed when downlink data (or downlink traffic) of the PDU session associated with non-3GPP access is generated in the case where a UE registered with the same PLMN for both 3GPP access and non-3GPP access is CM-IDLE in non-3GPP access. Specifically, in the above case, if 3GPP access is CM-IDLE, the AMF may page the UE through 3GPP access (see step 4.2b.3 in section 4.2.3.3 of TS 23.502). On the other hand, if the 3GPP access is CM-CONNECTED, the AMF may send a NAS Notification message to the UE through 3GPP access (see step 4c in section 4.2.3.3 of TS 23.502).

In 5GS, it is not necessary for the user plane to be activated for all generated PDU sessions because the UE enters the CM-CONNECTED state. In other words, only the user plane for a PDU session that needs to be used (or a PDU session in which data is generated) may be selectively activated (see TS 23.501, 5.6.8 Selective activation and deactivation of UP connection of existing PDU session. Hereinafter, activation of the user plane for a PDU session may be expressed as activation of user plane connection for the PDU session, N3 activation for the PDU session, N3 tunnel activation for the PDU session, and N3 tunnel activation for the PDU session, and activation of the PDU session. In addition, deactivation of the user plane for the PDU session may be expressed as deactivation of user plane connection for the PDU session, N3 deactivation for the PDU session, N3 tunnel deactivation for the PDU session, and deactivation of the PDU session).

In conventional LTE Release 14 V2X, when the UE transmits a V2X message over PC5, other UEs in the PC 5 range of the UE receive and decode the V2X message, and then forward the message to a corresponding V2X application if there are V2X services (e.g., PSID or ITS-AIDs of the V2X application) information mapped to the Destination Layer-2 ID of the message. For detailed operation, refer to TS 23.285, TS 24.385 and TS 24.386. TR 23.786 defines the agenda as shown in Table 2 below. This is because there is a need for a solution to which V2X application should be transmitted over a PC5 RAT when transmission is allowed not only in LTE but also in 5G radio technology, NR.

TABLE 2

5.2 Key Issue #2: 3GPP PC5 RAT selection for a V2X application
5.2.1 General description
A UE may support multiple radio access technologies (RATs) over PC5 interface, including LIE and NR.
For such UE, the most suitable 3GPP PC5 RAT(s) for V2X applications should be selected based on various criteria. For example, for the V2X application requiring low latency, the PC5 RAT that meets the required latency should be selected.
To support the proper selection of 3GPP PC5 RAT to use for a V2X application, the following aspects need to be studied:
    What parameters should be considered as input to 3GPP PC5 RAT selection for each V2X application, e.g. QoS parameters, RAN related parameters such as expected range of a RAT, operator policy, preferences for each V2X application, peer UE capabilities, etc.?

TABLE 2-continued

When and how the 3GPP PC5 RAT selection is performed? Is the 3GPP PC5 RAT selected before sending/receiving each V2X message, or is the 3GPP PC5 RAT selected based on static configuration for each V2X application?
How can 3GPP system support the 3GPP PC5 RAT selection for the V2X application?
When studying the above aspects, the following need to be considered:
When the UE is non-roaming and when the UE is roaming;
When the UE is in coverage and when the UE is out of coverage.
Editor's note: When necessary, RAN WGs should be involved during the study of this key issue.

In addition, even when the PC5 RAT is LTE, PC5 PHY format has been changed in LTE Release 15 to improve performance compared to LTE Release 14. PC5 64QAM for transmission at a high data rate is also under discussion. Even if the PC5 RAT used to transmit a V2X message is LTE, a UE in the vicinity of the transmitting UE that performs a transmission in the LTE Release 15 PHY format cannot decode the received (data of) LTE Release 15 PHY format if the receiving UE is LTE Release 14 UE. This is because a UE which does not have the function of PC5 64QAM cannot decode a V2X message transmitted using this function. As there are various PC5 transmission schemes even when the PC5 RAT is LTE, there may be a case where a radio terminal receives a V2X message but cannot decode/interpret the received message. Furthermore, when NR is added to the PC5 RATs, the PC5 transmission schemes may be further diversified, and thus various types of UEs supporting various combinations of the PC5 transmission schemes may coexist.

Therefore, when a certain UE transmits sensor information collected by the UE to other UEs over PC5 using NR in order to share the information, the transmission may be meaningless if only UEs incapable of performing PC5 communication through NR are present around the certain UE. As another example, when a certain UE transmits sensor information collected by the UE to other UEs over PC5 using LTE 64QAM in order to share the information, the transmission may be meaningless and PC5 resources may be wasted if only UEs capable of PC5 communication through LTE but incapable of communication through LTE 64QAM are present around the certain UE.

To address such issues, the present invention proposes an optimized PC5 transmission method for V2X services. In the following description, the terms V2X service and V2X application are used interchangeably.

Embodiment 1

Figure 8:
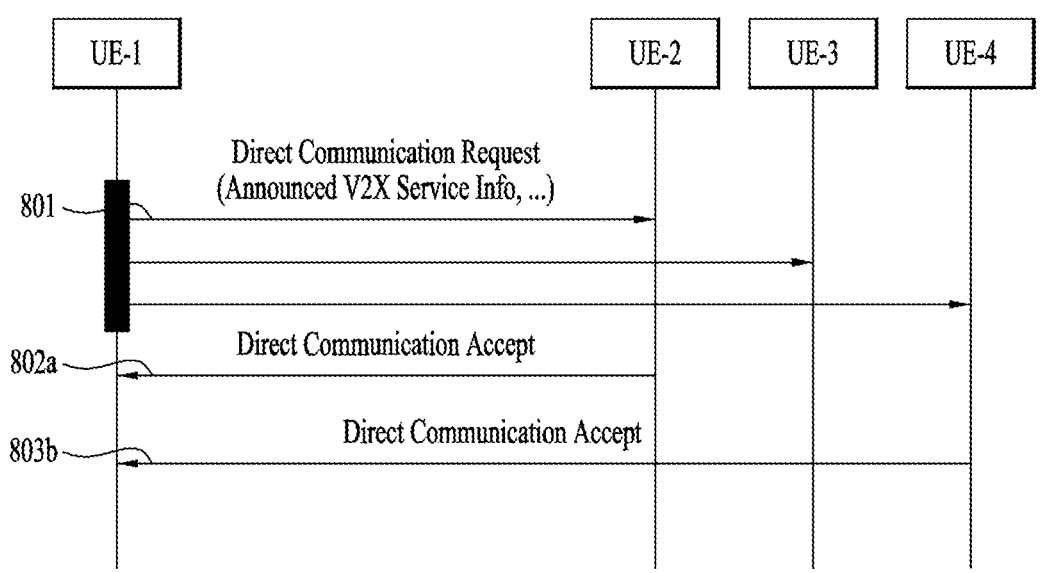
FIGS. 8 to 18 are diagrams illustrating an embodiment of the present invention.

FIG. 8 illustrates an embodiment of the present invention in relation to "V2X service oriented layer 2 link establishment." Referring to FIG. 8, a first UE (UE-1) according to an embodiment of the present invention may broadcast a Direct Communication Request message (S801). The Direct Communication Request message can be sent by UE-1 with broadcast mechanism, i.e. by using a broadcast address associated with the application. The information about V2X Service requesting L2 link establishment, i.e. information about the announced V2X Service is included in the Direct Communication Request message to allow other UEs to determine whether to respond to the request. The source L2 ID of this message should be the unicast L2 ID of the UE-1.

The broadcast Direct Communication Request message may be received by a plurality of UEs (UE-2, UE-3, UE-4, etc.). In this case, a Direct Communication Accept message may be received in a unicast manner from the second UE receiving the Direct Communication Request message. The Direct Communication Request message should be transmitted using default AS layer setting, e.g., broadcast setting, that can be understood by other UEs. Here, the reception of the Direct Communication Request message may mean that the message can be received and decoded by a radio terminal, or that the message is received by the radio terminal but cannot be decoded.

Thereafter, data of the V2X service may be unicast to the second UE. Here, the source Layer-2 ID included in the broadcast Direct Communication Request message may be used/configured as a destination Layer-2 ID of a Direct Communication Accept message for unicast reception of the data of the V2X service by the second UE. The UEs that are interested in using the V2X Service announced by the Direct Communication Request message can respond to the request (UE-2 and UE-4 in FIG. 8). Here, the UEs interested in the service may correspond to at least one of a UE that has determined to use the V2X service, a UE that has not determined to use the V2X service but intends to receive data of the V2X service and determine whether to use the V2X service, a UE that has determined to establish the L2 link for the V2X service with the first UE, or a UE that has determined to perform unicast communication with the first UE for the V2X service. When responding, the UE uses the source L2 ID of the received Direct Communication Request message as destination L2 ID in the subsequent signaling to UE-1, and uses its own unicast L2 ID as the source L2 ID. UE-1 obtains UE-2's L2 ID and UE-4's L2 ID for signaling for future communication and data traffic.

That is, the Direct Communication Request message is transmitted for establishment of a layer 2 link (V2X service oriented layer 2 link) unlike a broadcast message transmitted by a conventional base station or the like. The Direct Communication Request message includes information about the V2X service and a source Layer-2 ID, and the Direct Communication Accept message includes the ID of the second UE corresponding to the source Layer-2 ID. The source Layer-2 ID included in the broadcast Direct Communication Request message is used/configured as a destination Layer-2 ID of the Direct Communication Accept message for unicast reception of the data of the V2X service by the second UE. With this configuration, unicast transmission to a UE requiring a specific V2X service may be performed without using conventional signaling and resources required to establish a PC 5 link. Accordingly, the operation may be efficient. In the above, the statement that the Direct Communication Request message or the Direct Communication Accept message includes the source Layer-2 ID may be interpreted as meaning that the message is transmitted using the source Layer-2 ID, rather than meaning that the ID is included in the message itself.

In the above description, the Direct Communication Request message may include one or more of the following kinds of information.

1) Type of V2X service: Information about one or more V2X services (e.g., PSID or ITS-AIDs of the V2X application). This information may indicate a V2X application, be a PSID or an ITS-AID value, take a form obtained by coding the V2X service, or indicate a type of V2X traffic (e.g., sensor information, video information, or the like). Alternatively, a Direct Communication Request message for a specific V2X service may be configured by assigning a serial number for each V2X service to the message type value of the Direct Communication Request message.

2) Destination L2 ID to be used in transmitting V2X traffic: Indicates a Destination L2 ID to be used in actually transmitting V2X traffic.

3) Whether to transmit V2X traffic in IP type

4) Destination IP address to use in transmitting V2X traffic: Indicates a Destination IP address to be used in actually transmitting V2X traffic. This is included when V2X traffic is to be transmitted in IP type.

5) PC5 RAT to be used in transmitting V2X traffic: This may be one of PC5 RATs. For example, a PC5 RAT transmitting LTE and/or NR Direct Communication Request messages may implicitly indicate this information. That is, if the Direct Communication Request message is transmitted through LTE, it may indicate that V2X traffic is to be transmitted through LTE. If the Direct Communication Request message is transmitted through NR, it may indicate that V2X traffic is to be transmitted through NR.

6) PC5 transmission scheme to be used in transmitting V2X traffic: Examples of information related to the PC5 transmission scheme may include information about the PC5 PHY format, information about the PC5 transmission release (e.g., LTE Release 14, LTE Release 15, LTE Release 16, etc.), Information about whether 64QAM is used, information about whether Tx diversity is used, and information about whether rate matching is used. That is, this indicates a transmission scheme that can be used/applied for PC5 transmission.

This may take various forms such as a bitmap, a coded form, a table, a Tx profile, and an index, and may be coupled/combined with the information of 5). There may be multiple schemes, and prefer/prioritize information may be explicitly or implicitly indicated.

For example, the information may indicate that transmission is performed using 64QAM in LTE.

When there are multiple schemes, the information may indicate transmission in "NR" and transmission in "LTE 64QAM", wherein the first one may have the highest priority.

7) Location information: represents the location information about the UE. This information may be coordinate information, cell information, or the like. This information may be provided by the Application Layer and be included in the Direct Communication Request message in the form of a transparent container. In this case, various kinds of application layer information other than the location information may be included in the transparent container.

8) Information instructing that a response should be sent when the Direct Communication Request message is received a specific number of times or more for a specific time: This is information indicating that a response for receiving V2X traffic (e.g., a Direct Communication Accept message/Service Announcement Ack message) will be transmitted only when a Direct Communication Request message is received from the same UE a certain number of times or more for a certain time. This information includes time information (several milliseconds (ms), several seconds (sec), several minutes (min), etc.) and number-of-times information. The number-of-times information may be represented as "repetition."

When a Direct Communication Request message is transmitted, a UE receiving the message is present within the PC5 range of the UE transmitting the message, and thus transmits a response that it will receive V2X traffic. However, when V2X traffic is actually transmitted, the UE transmitting the response may move away (as it is, for example, e.g. a UE running in the opposite lane, a UE running along another branch at an intersection, etc.). The above-described information is intended to prevent V2X traffic from being transmitted when there is no UE to receive the V2X traffic.

9) Reference number/ID/code (or random number/ID/code): Reference number for the Direct Communication Request message. The reference number may be a serial number or a number generated at random. A new reference number may be generated when another Direct Communication Request message is transmitted after transmission of V2X traffic is completed.

10) Source L2 ID to use in transmitting V2X traffic: A Source L2 ID that is to be actually used in transmitting V2X traffic.

11) Source IP address to use in transmitting V2X traffic: A source IP address that is to be actually used in transmitting V2X traffic. This information is included when V2X traffic is to be transmitted in IP type.

The information in items 2) to 11) may not be configured as one piece per Direct Communication Request message, but as one piece per V2X service indicated by the Direct Communication Request message. Alternatively, certain information of the information in items 2) to 11) may be configured as one piece per Direct Communication Request message and other information may be configured as one piece per V2X service indicated by the Direct Communication Request message.

Whether the Direct Communication Request message is transmitted from the same UE may be determined based on one or a combination of two or more of the information types in items 1) to 11).

A part of the above-described information (e.g., the information of item 10)) may be included in a message header of a lower layer (which may be interpreted as an AS layer or a Layer 2 layer or a radio layer) transmitting the Direct Communication Request message rather than in the Direct Communication Request message itself.

The PC5 RAT for the Direct Communication Request message (including a response message thereto) may be defined as LTE and/or NR. It may also be defined as a PC5 discovery channel (aka PC5-D), a PC5 communication channel (aka PC5-U), or a specific PC5 channel for transmission of the Direct Communication Request message.

In the above description, the Direct Communication Accept message may be transmitted as V2X traffic to be transmitted by UE #1 can be received/decoded/understood. The Direct Communication Accept message may be understood as being transmitted by a UE having a capability of receiving the message transmitted by UE #1. In addition, a UE that has transmitted the Direct Communication Accept message may store information (typically L2 ID information, IP address information) necessary for receiving V2X traffic among the kinds of information included in the received Direct Communication Request message.

The location information corresponding to item 7) of the Direct Communication Request message may be included in the Direct Communication Request message or may be obtained through a basic V2X message (which may be a basic road safety message such as, for example, CAM, DENM, and BSM) transmitted by UE #1 if not included in the Direct Communication Request message. If a UE desires to receive the V2X service indicated by the Direct Communication Request message, based on the location information, the UE may determine to transmit a response message over PC5 in response to the message. For example, if the UE desires to receive the V2X service from a UE located ahead thereof but does not desire to receive the V2X service from a UE located behind, it may determine to transmit a response message only to the UE ahead.

Item 8) of the Direct Communication Request message may be included in the Direct Communication Request message or may be configured/provisioned in the UE. When this information is present, the UE transmits a Direct Communication Accept message based on the information when the condition is met. Alternatively, if the UE desires to receive the V2X service indicated by the Direct Communication Request message even when it receives the Direct Communication Request message once, the UE may determine to transmit a response message to the message over PC5.

The Direct Communication Accept message may include one or more of the following kinds of information. For details such as how to express the following information, refer to the description of the Direct Communication Request message:

a) Type of V2X service: Information about a V2X service that is to be received (or receivable) among the V2X services indicated by the Direct Communication Request message;

b) PC5 RAT through which V2X traffic can be received: Information about a PC5 RAT allowing the reception operation among the PC5 RATs indicated by the Direct Communication Request message;

c) PC5 transmission scheme by which V2X traffic can be received: Information about a PC5 transmission scheme allowing the reception operation among the PC5 transmission schemes indicated by the Direct Communication Request message. That is, this information indicates a transmission scheme that may be used/applied for PC5 reception. This information may be coupled/combined with the information of item b). When there are multiple (PC 5 transmission) schemes, prefer/prioritize information may be indicated explicitly or implicitly;

d) Reference number/ID/code (or random number/ID/code): A reference number/ID/code (or random number/ID/code) included in the Direct Communication Request message.

If the information of items a), b) and c) is not included, this may be interpreted as meaning that the content (information) included in the Direct Communication Request message is applied. For example, if the information of item a) is not included, this may be interpreted as indicating that the UE desires to receive all V2X services indicated by the Direct Communication Request message. As another example, if the information of items b) and c) is not included, this may be interpreted as indicating that the V2X traffic can be received using a PC5 RAT and a transmission scheme indicated by the Direct Communication Request message.

Next, regarding unicast transmission of the data of a V2X service to the second UE, if the source L2 ID, the destination L2 ID, the source IP address (given when V2X traffic is transmitted in the IP type) and the Destination IP address (given when V2X traffic is transmitted in the IP type) are included in the Direct Communication Request message, the values thereof are used for the transmission. Otherwise (if they are not included in the Direct Communication Request message), values generated by the UE or set values are used.

The V2X traffic transmission scheme may be finally determined based on the information of items 5) and 6) included in Direct Communication Request message and/or the information of items b) and c) included or not included in Direct Communication Accept message. If multiple transmission schemes are available for a V2X service, a scheme available for reception by all UEs that have transmitted a Direct Communication Accept message should be selected. In addition, if there are multiple schemes available for reception by all UEs that have transmitted the Direct Communication Accept message, the best transmission scheme may be selected from among the multiple schemes. Here, the best transmission scheme may refer to a scheme that exhibits the best performance, a scheme having the highest priority, or a scheme having the highest preference. For example, suppose that transmission schemes available for transmission of V2X traffic for a V2X service to be transmitted by UE #1 are Tx_Mechanism #1 and Tx_Mechanism #2, which have priorities in this order. In this case, if UE #3 has transmitted the two mechanisms in a Direct Communication Accept message and UE #4 has transmitted only Tx_Mechanism #2 in a Direct Communication Accept message, UE #1 may select Tx_Mechanism #2 for transmission of V2X traffic.

Figure 9:
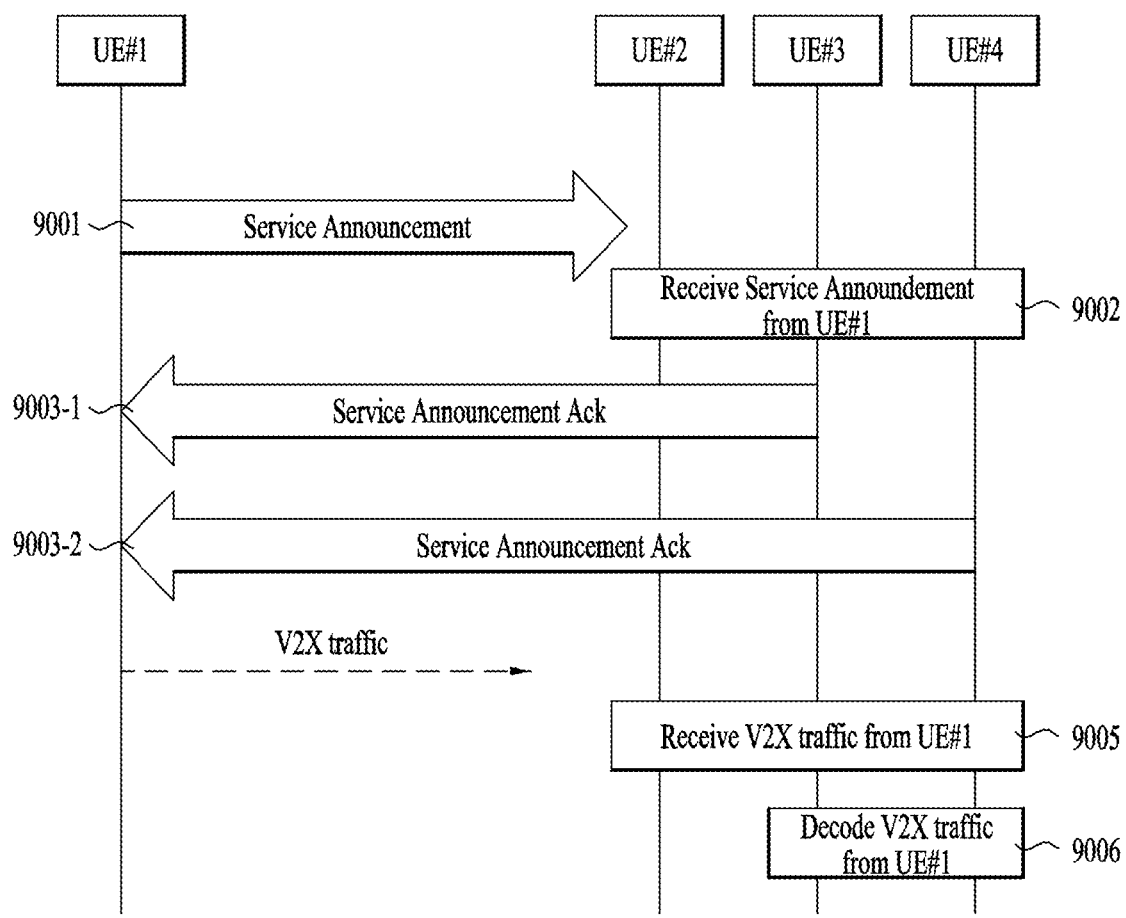

FIG. 9 illustrates an embodiment similar to that described above with reference to FIG. 8. For contents which are not described in detail in the description of FIG. 9, refer to the corresponding parts in the description of FIG. 8.

In step S901, UE #1 transmits, over PC5, a message for informing other UEs of a V2X service that can be transmitted to/shared with other UEs. Such a message may be, for example, a Service Announcement message, a Service Advertisement message, a Direct Communication Request message (which may be interpreted as a message for requesting establishment of a PC5 session/link), or the like.

In step S902, the Direct Communication Request message/Service Announcement message transmitted by UE #1 is received by neighboring UEs (which may be interpreted as UEs within the PC5 range or UEs within the reception range of the PC5 message transmitted by UE #1). In FIG. 9, it is assumed that UE #2, UE #3, and UE #4 have received the message. Here, receiving the Direct Communication Request message/Service Announcement message may mean that a radio terminal receives the message and can decode the received message, or that a radio terminal receives the message but cannot decode the received message.

In step S903, a UE that desires to receive the V2X service indicated by the Service Announcement message (which may refer to a UE capable of receiving the V2X service) transmits a response message to the message over PC5. Such a message may be, for example, a Service Announcement Ack message, an Interest message, or a Direct Communication Accept message.

In step S904, UE #1 transmits V2X traffic upon receiving the Direct Communication Accept message.

In step S905, neighboring UEs (which may be interpreted as UEs within the PC5 range or UEs within the reception range of the PC5 message transmitted by UE #1) receive the V2X traffic transmitted by UE #1 over PC5. In FIG. 9, it is assumed that UE #2, UE #3, and UE #4 have received the message. Here, receiving the V2X traffic may mean that a radio terminal receives the V2X traffic and can decode the received V2X traffic, or that a radio terminal receives the V2X traffic but cannot decode the received V2X traffic.

In step S906, UE #3 and UE #4 decode the received V2X traffic. Thereafter, the V2X traffic may be further verified/filtered according to the L2 ID information and the IP address information stored in 59063. In case of UE #2, even if the V2X traffic is received by the radio terminal, it may not be decoded/interpreted.

Figure 10:
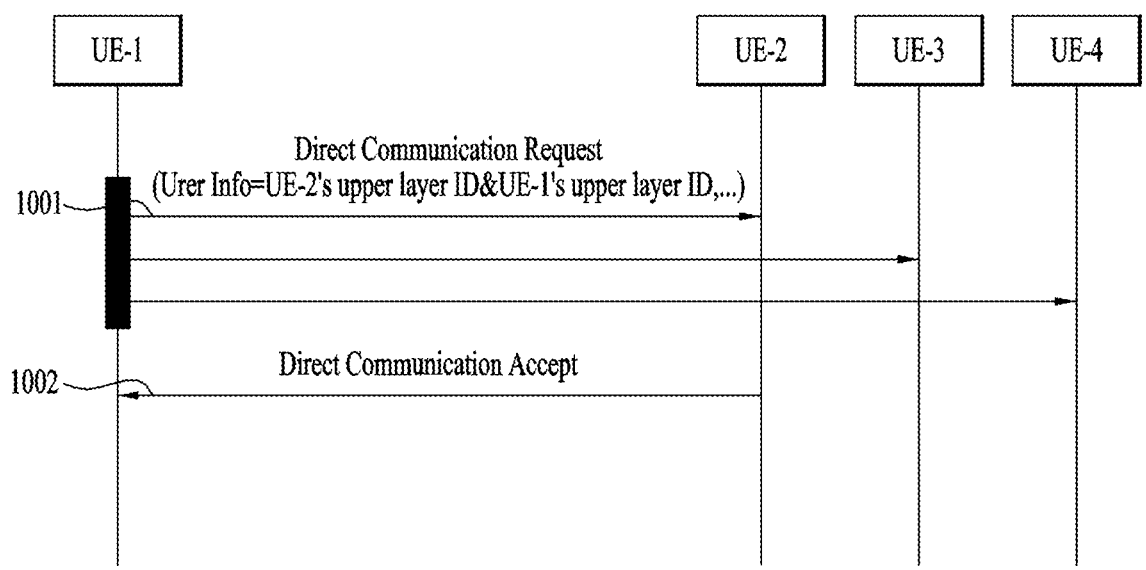
Figure 11:
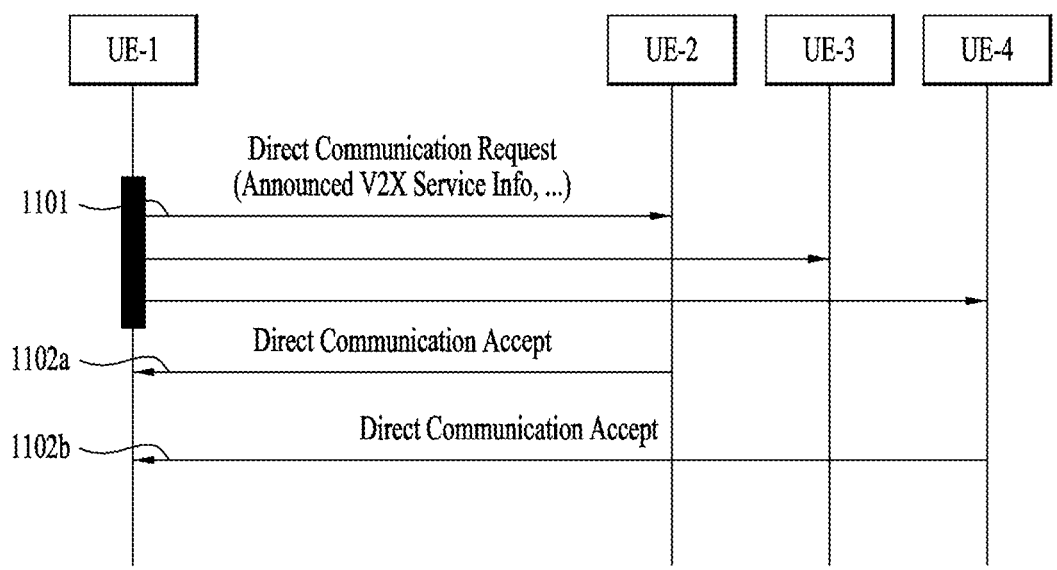
Figure 12:
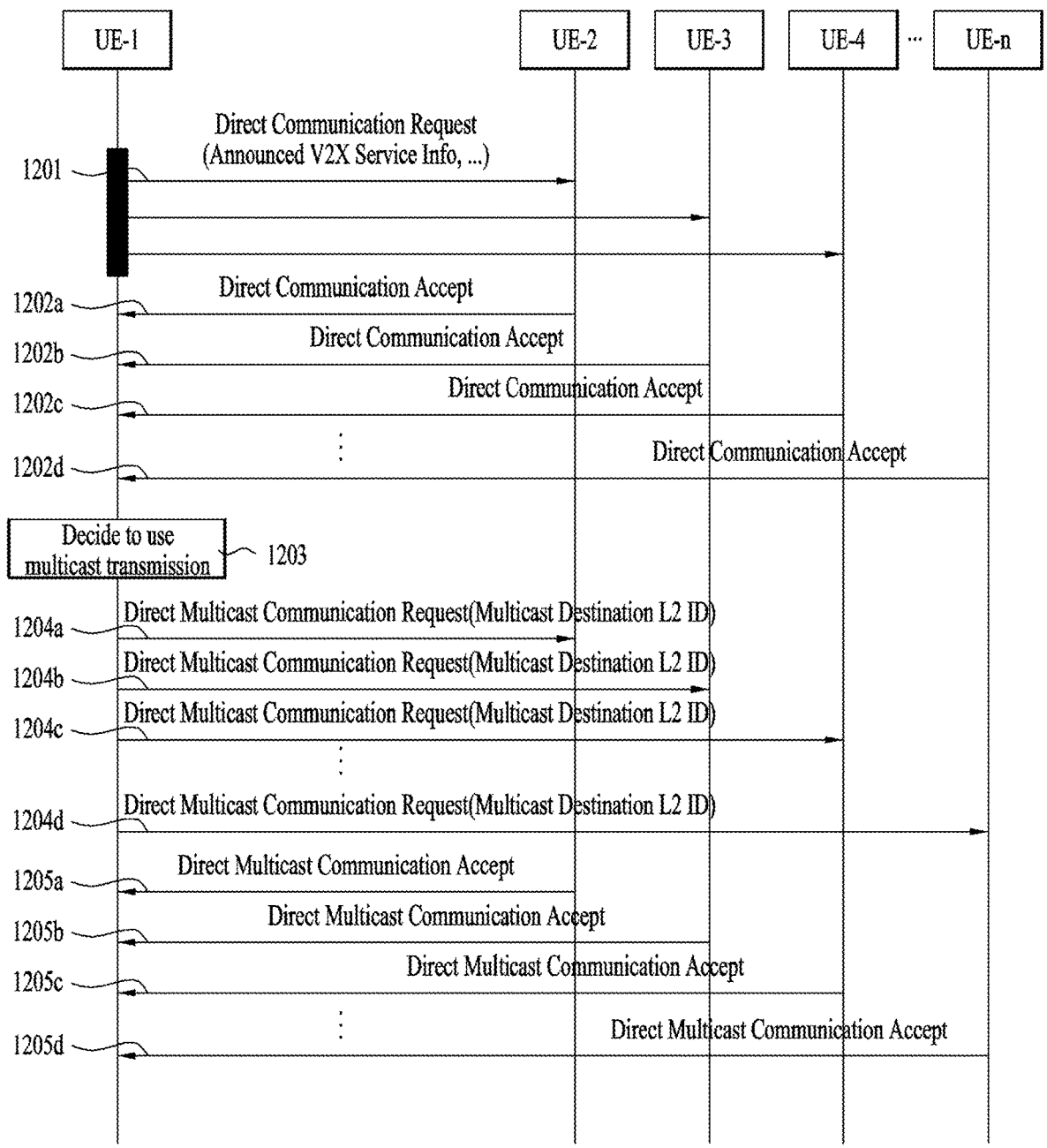
Figure 13:
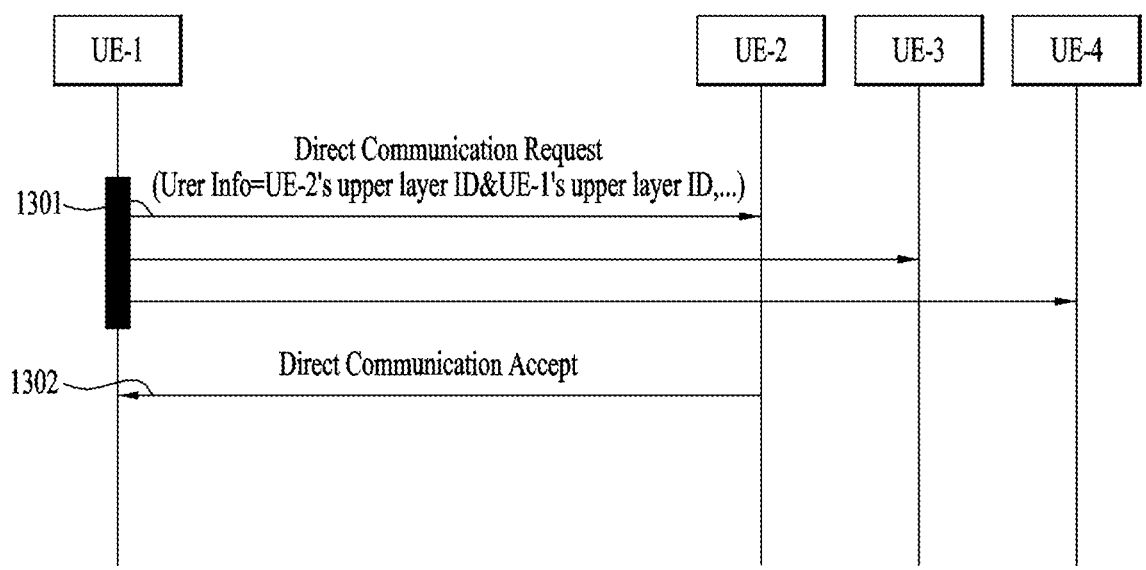
Figure 14:
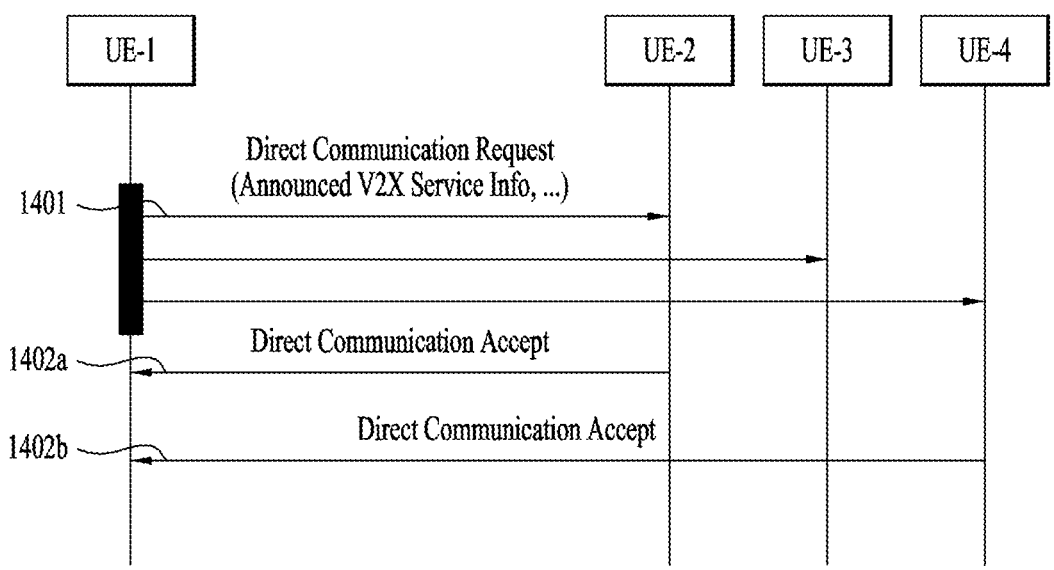
Figure 15:
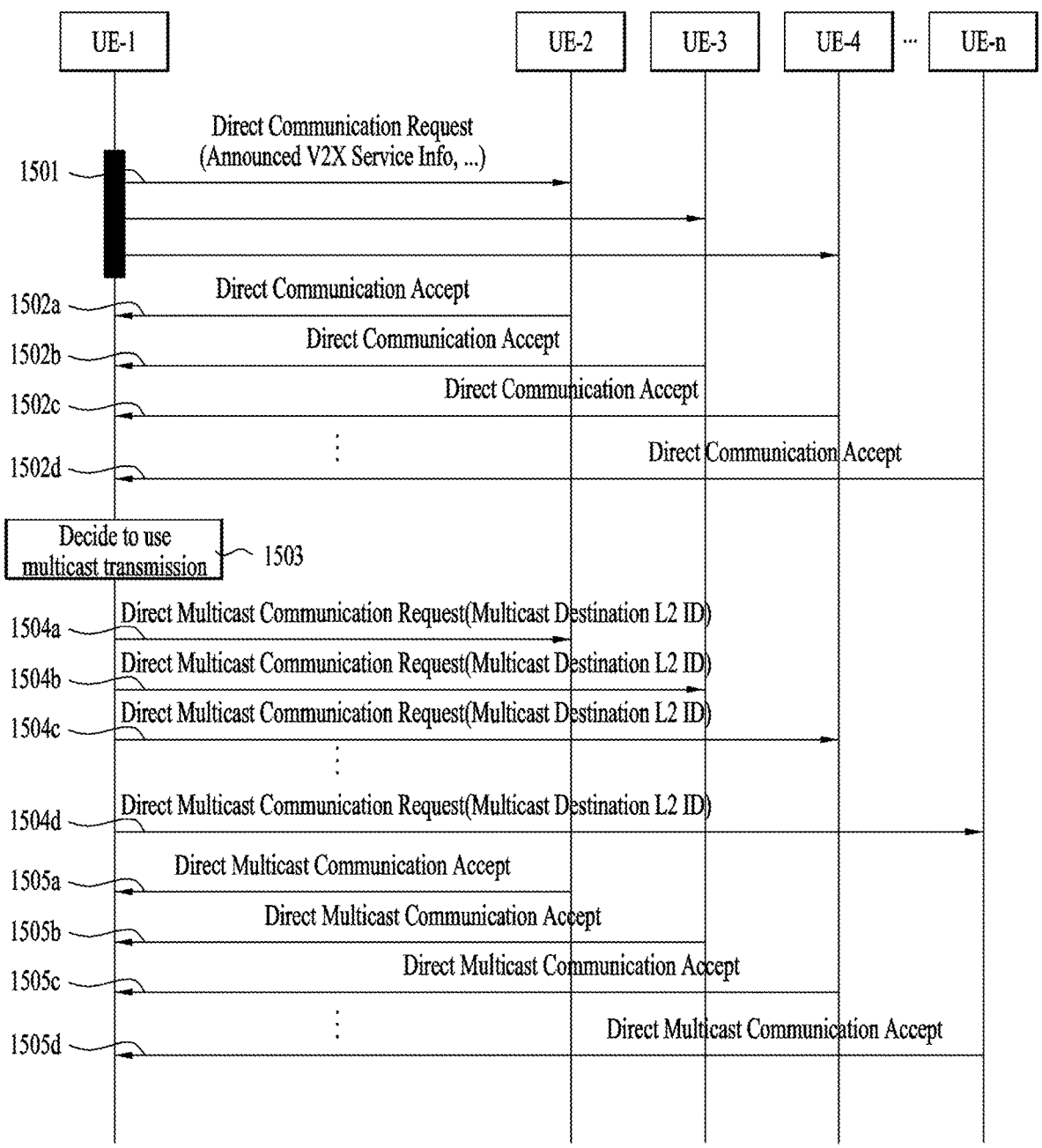

Tables 3 to 7 below, which are from contribution documents submitted to the 3GPP by the inventors of the present invention, are incorporated in and constitute a part of this application. In Tables 3 to 7, FIG. 1 refers to FIG. 10, FIG. 2 refers to FIG. 11, FIG. 3 refers to FIG. 12, FIG. 6.11.3.1-1 refers to FIG. 13, FIG. 6.11.3.1-2 refers to FIG. 14, and FIG. 6.11.3.1-3 refers to FIG. 15.

TABLE 3

1. Discussion
Currently, Solution#11 describes Establishment of layer 2 link over PC5 as following FIG. 1:
In this mechanism, UE-1 sends a Direct Communication Request message targeting to UE-2, anyhow this message is broadcasted in terms of lower layers, i.e. AS layer. Let's call this mechanism "UE oriented L2 link establishment".
In addition to "UE oriented L2 link establishment", we can think about "V2X Service oriented L2 link establishment". This is related to the following EN and to resolve this.
6.11.2.5        Procedures for the link establishment and maintenance
. . .
Some addition considerations for the V2X for the link/group handling is required though. For V2X communication, not all UEs will be supporting or use unicast communication. In addition, not all services may be run over the same channel or RAT (e.g. LTE V2X vs. NR V2X). With V2X, there is no discovery channel like that of ProSe (i.e. PC5-D), and there is no assumption on the configuration from network as that of Public Safety use. Therefore, in order to support the link establishment, there is a need for service announcement in order to inform the peer of the existence of the UE and the capability of the UE for the unicast communication, e.g. channel to operate, or the services supported, etc.
Such a service announcement should be made accessible to all the UEs that is interested in using the service. For example, such announcement could be either configured to send over a dedicate channel, similar to how WAVE Service Advertisement (WSA) is handled, or to be piggybacked on the periodical messages from the supporting UEs.
Editor's note: It is FFS how such announcement can be made accessible to all UEs interested in the service without creating high overhead for the system.
In the proposed "V2X Service oriented L2 link establishment", differences from "UE oriented L2 link establishment" are as follows:
  1) A Direct Communication Request message includes information about V2X Service requesting L2 link establishment instead of including the target UE's ID. The information about the V2X Service is included in "Announced V2X Service Info" IE and can be e.g. PSID or ITS-AIDs of the V2X application. Sensor Sharing, and etc can be the case for the V2X Service.
  2) The UEs that are interested in using the V2X Service announced by the Direct Communication Request message can respond with a Direct Communication Accept message.
FIG. 2 shows the proposed "UE oriented L2 link establishment". Here, UE-2 and UE-4 are the UEs that are interested in using the V2X Service announced by UE-1 and want to establish L2 link over PC5 with UE-1.
Proposal 1: We propose to add "V2X Service oriented L2 link establishment" to Solution#11.
Regarding the "V2X Service oriented L2 link establishment" introduced above, PC5 resource utilization and efficiency need to be considered. If several or many UEs are interested in using the V2X Service announced by UE-1 and want to establish L2 link over PC5 with UE-1, UE-1 has to transmit data traffic to each peer UE after establishing L2 link with all the UEs sent the Direct Communication Accept message. This means if the number of peer UEs is 10, UE-1 has to transmit same data traffic 10 times by setting a Destination L2 ID to each peer UE's L2 ID.
This would cause PC5 resource waste problem.
In order to resolve this problem, it is proposed that UE-1 (i.e. an initiating UE for V2X Service oriented L2 link establishment) can decide to transmit data traffic in a multicast manner instead of unicast manner if the number of peer UEs exceeds the preconfigured threshold as shown in step 3 of FIG. 3. For multicast transmission, UE-1 lets each peer UE know a Destination L2 ID used for multicast transmission as shown in step 4 of FIG. 3 and uses the Multicast Destination L2 ID instead of each peer UE's L2 ID when sending data traffic. Therefore, UE-1 does not have to transmit same data traffic destined to each peer UE repeatedly which means UE-1 transmits data traffic only one time destined to the Multicast Destination L2 ID.

TABLE 4

Proposal 2: It is proposed to introduce "V2X Service oriented L2 link establishment for multicast transmission" to Solution#11 for PC5 resource utilization and efficiency in which an initiating UE for V2X Service oriented L2 link establishment can decide to transmit data traffic in a multicast manner.
Although data traffic is transmitted in a multicast manner, UE-1 can maintain the established L2 link with each peer UE (i.e. L2 link with UE-2, L2 link with UE-3, L2 link with UE-4, . . . , L2 link with UE-n in FIG. 3) for Link identifier update as described in clause 6.11.3.3 and etc.
2. Proposal
The following changes are proposed to Solution#11 in TR 23.786v0.8.0.
                    * * * * Start of 1st Chance * * * *
6.11.2.5        Procedures for the link establishment and maintenance
TS 23.303 [8] has defined the procedures for the establishment and maintenance of secure L2 link over PC5, as in clause 5.4.5. These procedures can be enhanced and adapted for the V2X use, subject to the decisions above regarding signalling protocol choice, security handling, etc.

TABLE 4-continued

Some addition considerations for the V2X for the link/group handling is required though. For V2X communication, not all UEs will be supporting or use unicast communication. In addition, not all services may be run over the same channel or RAT (e.g. LTE V2X vs. NR V2X). With V2X, there is no discovery channel like that of ProSe (i.e. PC5-D), and there is no assumption on the configuration from network as that of Public Safety use. Therefore, in order to support the link establishment, there is a need for service announcement in order to inform the peer of the existence of the UE and the capability of the UE for the unicast communication, e.g. channel to operate, or the services supported, etc.

Such a service announcement should be made accessible to all the UEs that are interested in using the service. For example, such announcement could be either configured to send over a dedicate channel, similar to how WAVE Service Advertisement (WSA) is handled, to be piggybacked on the periodical messages from the supporting UEs, or to be piggybacked on the message for layer 2 link establishment request from the supporting UE.

\* \* \* \* Start of 2nd Chance \* \* \* \*

6.11.3.1    Establishment of layer 2 link over PC5

Layer-2 link establishment procedure as defined in TS 23.303 [8] clause 5.4.5.2 can be reused for the eV2X unicast link establishment, with the following adaptations:

The messages may be converted to RRC signaling message instead of PC5 signaling message, depends on RAN WG's decision.

"UE: oriented layer 2 link establishment" operates as below and FIG. 6.11.3.1-1 shows the procedure:

The Direct Communication Request message can be sent by UE-1 with broadcast mechanism, i.e. to a broadcast address associated with the application instead of the L2 ID of UE-2. The upper identifier of UE-2 is included in the Direct Communication Request message to allow UE-2 to decide on if to respond to the request. The Source L2 ID of this message should be the unicast L2 ID of the UE-1. The Direct Communication Request message should be transmitted using default AS layer setting e.g. broadcast setting, that can be understood by UE-2.

TABLE 5

UE-2 uses the source L2 ID of the received Direct Communication Request message as destination L2 ID in the subsequent signalling to UE-1, and uses its own unicast L2 ID as the source L2 ID.

UE-1 obtains UE-2's L2 ID for future communication, for signalling and data traffic.

"V2X Service oriented layer 2 link establishment" operates as below and FIG. 6.11.3.1-2 shows the procedure:

The Direct Communication Request message can be sent by UE-1 with broadcast mechanism, i.e. to a broadcast address associated with the application. The information about V2X Service requesting L2 link establishment, .i.e. information about the announced V2X Service is included in the Direct Communication Request message to allow other UEs to decide on if to respond to the request. The Source L2 ID of this message should be the unicast L2 ID of the UE-1.

The Direct Communication Request message should be transmitted using default AS layer setting e.g. broadcast setting, that can be understood by other UEs.

The UEs that are interested in using the V2X Service announced by the Direct Communication Request message can respond to the request (UE-2 and UE-4 in FIG. 6.11.3.1-2). When responding the UE uses the source L2 ID of the received Direct Communication Request message as destination L2 ID in the subsequent signalling to UE-1, and uses its own unicast L2 ID as the source L2 ID. UE-1 obtains UE-2's L2 ID and UE--4's L2 ID for future communication, for signalling and data traffic.

Regarding the "V2X Service oriented L2 link establishment" introduced above, PC5 resource utilization and efficiency need to be considered. If several or many UEs are interested in using the V2X Service announced by UE-1 and want to establish L2 link over PC5 with USE-1, UE-1 has to transmit data traffic to each peer UE after establishing L2 link with all the UEs sent the Direct Communication Accept message. This means if the number of peer UEs is 10, UE-1 has to transmit same data traffic 10 times by setting a Destination L2 ID to each peer UE's LD ID. This would cause PC5 resource waste problem. In order to resolve this problem, it is proposed to introduce "V2X Service oriented L2 link establishment for multicast transmission".

"V2X Service oriented L2 link establishment for multicast transmission" operates as below and FIG. 6.11.3.1-3 shows the procedure:

Steps 1-2.    These steps are same to steps 1-2 of FIG. 6.11.3.1-2.

Step 3.    UE-1 (i.e. an initiating UE for V2X Service oriented L2 link establishment) can decide to transmit data traffic in a multicast manner instead of unicast manner if the number of peer UEs (i.e. the UEs sending the Direct Communication Accept message) exceeds the preconfigured threshold. The preconfigured threshold can be configured/updated for the UE by the network.

Step 4.    For multicast transmission, UE-1 lets each peer UE know a Destination L2 ID used for multicast transmission by sending a Direct Multicast Communication Request message.

Step 5.    Each peer UE responds to UE-1 with a Direct Multicast Communication Accept message.

Thereafter, UE-1 uses the Multicast Destination L2 ID as a Destination L2 ID when sending data traffic, instead of using each peer UE's L2 ID. Therefore, UE-1 does not have to transmit same data traffic destined to each peer UE repeatedly which means UE-1 transmits data traffic only one time destined to the Multicast Destination L2 ID.

Although data traffic is transmitted in a multicast manner, UE-1 can maintain the established L2 link with each peer UE (i.e. L2 link with UE-2, L2 link with UE-3, L2 link with UE-4, . . . , L2 with UE-n in FIG. 6.11.3.1-3) for Link identifier update as described in clause 6.11.3.3 and etc. Here, maintaining the L2 link with each peer UE can mean that UE-1 has information about peer UE(s) (i.e., UE(s) has sent a Direct Communication Accept and/or Direct Communication Accept to UE-1 as a response), typically, L2 ID of the UE stored therein.

UE-1 may determine that data traffic transmission using the Multicast Destination L2 ID is not necessary anymore depending on the link maintenance operation (e.g., keep-alive operation) with each peer UE and/or L2 link release. That is, it may determine that there is no more remaining peer UE.

TABLE 6

UE-1 may switch from multicast transmission to unicast when the number of peer UEs is less than the threshold. To this end, it informs each peer UE that the UE will switch to unicast transmission, and then transmit data traffic by setting each peer UE's L2 ID as Destination L2 ID.

The Multicast Destination L2 ID may be updated for privacy protection. In this case, UE-1 performs the operation if updating the ID for all peer UEs (at once or individually).
Alternatively, if UE-1 transmit the Multicast Destination L2 ID in step 1 and determines multicast transmission in step 3, it may inform peer UEs that the UE will perform multicast transmission instead of unicast transmission. In this case, a response from each peer UE (i.e., step 5 of FIG. 6.11.3.1-3) may be omitted. The operation of informing the peer UEs that multicast transmission will be performed instead of unicast transmission may be performed for each peer UE (transmitting a notification message by configuring the L2 ID of each peer UE as a target/Destination L2 ID) or at once (transmitting a notification message by configuring the Multicast Destination L2 ID included in step 1 as a target/Destination L2 ID).
The layer 2 link supports the non-IP traffic. No IP address negotiation and allocation procedure would be carried out.
6.11.3.2        Contents of the signalling message for link establishment
The information carried in Direct Communication Request message defined in TS 24.334 [13] requires at least the following updates:
    "For UE oriented layer 2 link establishment".
        The User Info needs to include the target UE's ID (UE-2's upper layer ID), besides the initiating UE's ID (UE-1's upper layer ID).
  NOTE:   Stage 3 can decide if these IDs can be carried in the same IE or separate IEs, for example, the Station ID/Vehicle Temp ID only needs to be 4 octets.
    For "V2X Service oriented layer 2 link establishment".
        The Announcement V2X Service Info needs to include the information about V2X Service requesting L2 link establishment, e.g. PSID or ITS-AIDS of the V2X application. Sensor Sharing, and etc can be the case for the V2X Service.
    The IP Address Config, which is specified as mandatory for ProSe, should allow an indication that no IP is to be used, such that the receiving UE (e.g. UE-2) would not start any IP configuration procedure for this particular link.
    The IEs dedicated for security need to be reviewed by SA3, as the security mechanism for eV2X may be different and requires different IEs.
    Additional configuraiton information regarding the link, e.g. when RRC message is used there may be AS layer configurations.
                     * * * * Start of 3rd Change * * * *
6.11.5        Topics for further study
Following topics need further study:

TABLE 7 whether PC5 Signalling protocol or RRC message should be extended to support unicast communication;
whether a connection-oriented QoS model should be used for unicast communication;
whether and how to support L2 ID change during a unicast session.
            * * * * End of Changes * * * *

Figure 16:
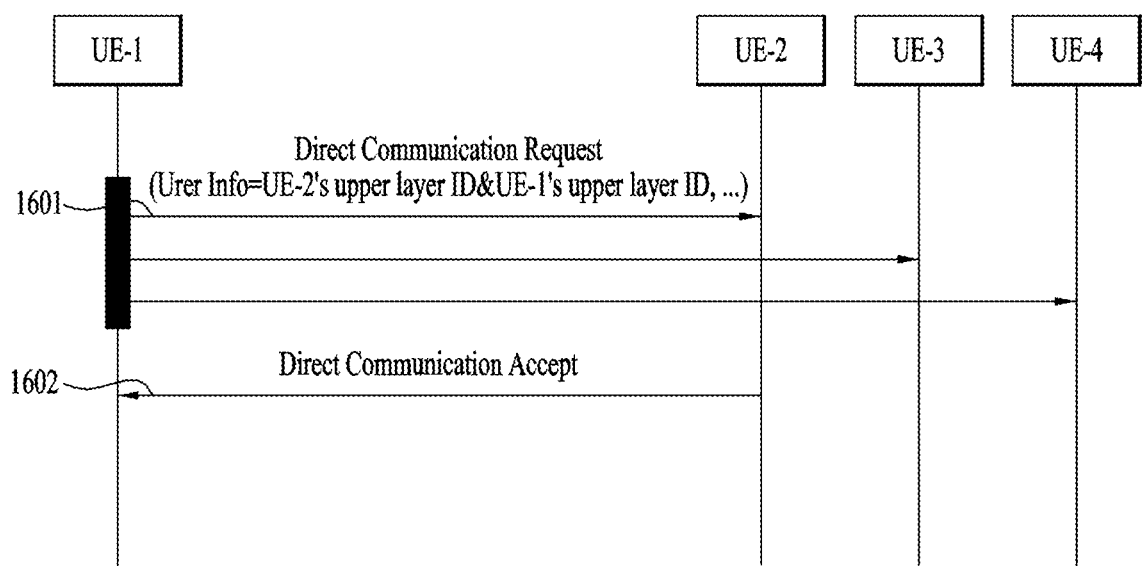
Figure 17:
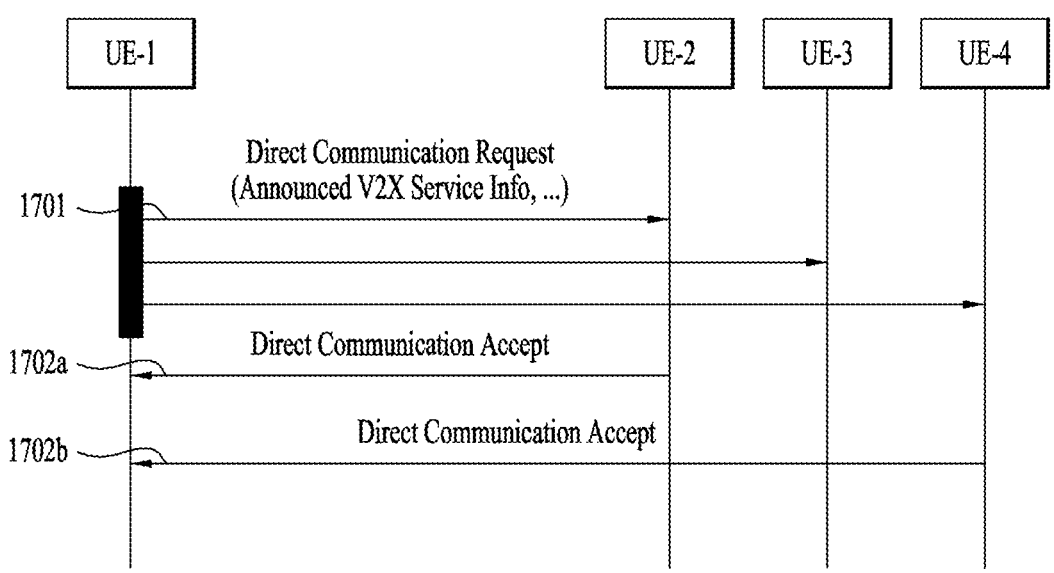
Figure 18:
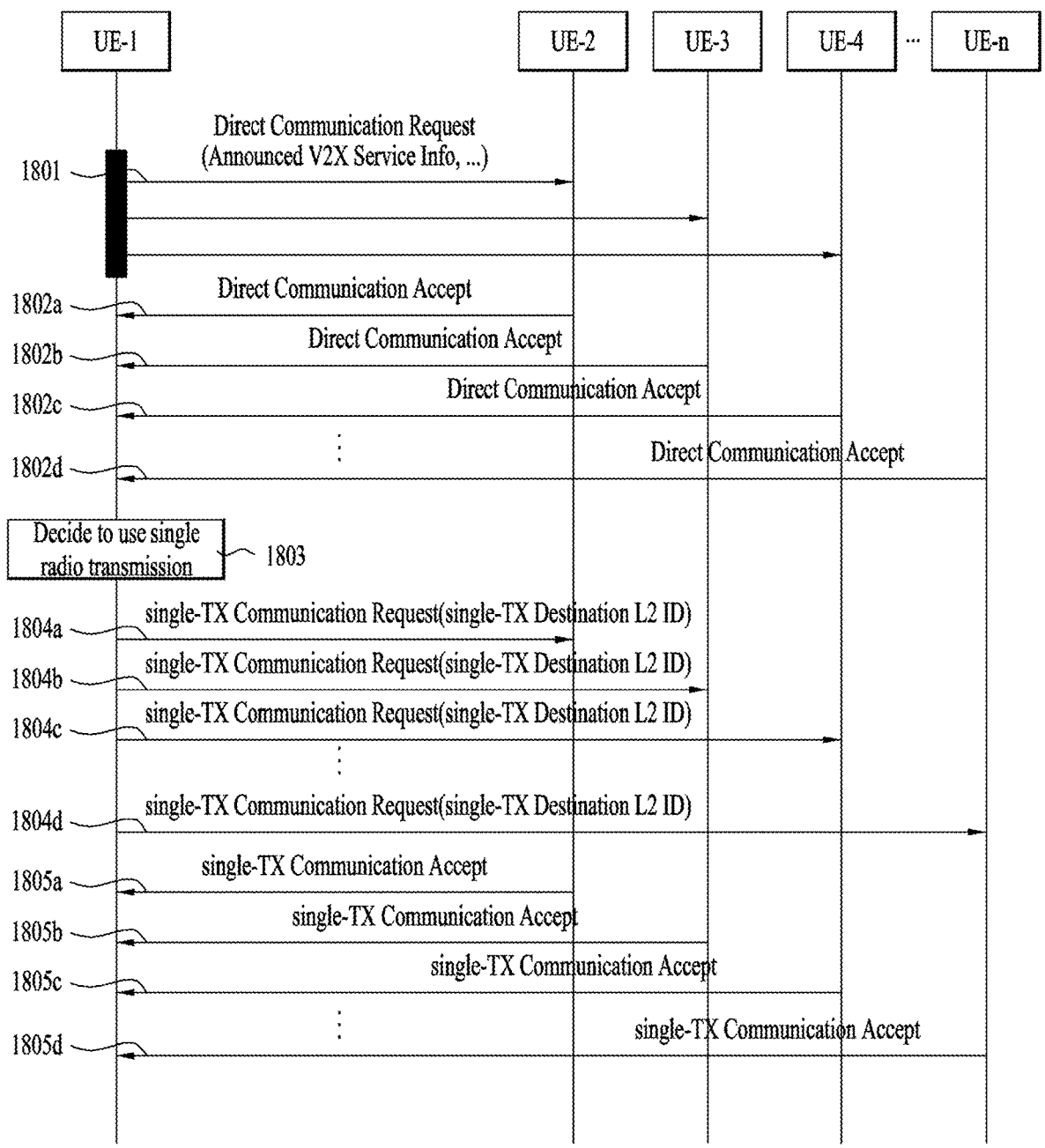

Tables 8 to 11 below, which are from contribution documents submitted to the 3GPP by the inventors of the present invention, are incorporated in and constitute a part of this application. In Table 8 to Table 11, FIG. 6.11.3.1-1a refers to FIG. 16, FIG. 6.11.3.1-2a refers to FIG. 17, and FIG. 6.11.3.1-3a refers to FIG. 18.

TABLE 8

The following changes are proposed to Solution#11 in TR 23.786.
                * * * * Start of 1st Change * * * *
6.11.2.5        Procedures for the link establislunent and maintenance
TS 23.303 [8] has defined the procedures for the establishment and maintenance of secure L2 link over PC5, as in clause 5.4.5. These procedures can be enhanced and adapted for the V2X use, subject to the decisions above regarding signalling protocol choice, security handling, etc.
Some addition considerations for the V2X for the link/group handling is required though. For V2X communication, not all UEs will be supporting or use unicast communication. In addition, not all services may be run over the same channel or RAT (e.g. LTE V2X vs. NR V2X). With V2X, there is no discovery channel like that of ProSe (i.e. PC5-D), and there is no assumption on the configuration from network as that of Public Safety use. Therefore, in order to support the link establishment, there is a need for service announcement in order to inform the peer of the existence of the UE and the capability of the UE for the unicast communication, e.g. channel to operate, or the services supported, etc.
Such a service announcement should be made accessible to all the UEs that are interested in using the service. For example, such announcement could be either configured to send over a dedicate channel, similar to how WAVE Service Advertisement (WSA) is handled, to be piggybacked on the periodical messages from the supporting UEs, or to be piggybacked on the message for layer 2 link establishmem request from the supporting UE.
For layer 2 link maintenance, keep-alive functionality is needed to detect that when the UEs are not in direct communication range, so that they can proceed with implicit layer 2 link release.

TABLE 8-continued

NOTE:   It is left to Stage 3 to determine how keep-alive functionality is supported.

\* \* \* \* Start of 2nd Change \* \* \* \*

6.11.3.1        Establishment of layer 2 link over PC5

Layer-2 link establishment procedure as defined in TS 23.303 [8] clause 5.4.5.2 can be reused for the eV2X unicast link establishment, with the following adaptations:
  The messages may be converted to RRC signaling message instead of PC5 signaling message, depends
  on RAN WG's decision.
  "UE oriented layer 2 link establishment" operates as below and FIG. 6.11.3.1-1 shows the procedure:
    The Direct Communication Request message can be sent by UE-1 with broadcast mechanism, i.e. to a
    broadcast address associated with the application instead of the L2 ID of UE-2. The upper identifier
    of UE-2 is included in the Direct Communication Request message to allow UE-2 to decide on if to
    respond to the request. The Source L2 ID of this message should be the unicast L2 ID of the UE-1.
    The Direct Communication Request message should be transmitted using default AS layer setting e.g.
    broadcast setting, that can be understood by UE-2.
    UE-2 uses the source L2 ID of the received Direct Communication Request message as destination
    L2 ID in the subsequent signalling to UE-1, and use its own unicast L2 ID as the source L2 ID.
    UE-1 obtains UE-2's L2 ID for future communication, for signalling and data traffic.

TABLE 9

"V2N Service oriented layer 2 link establishment" operates as below and FIG. 6.11.3.1-2 shows the
procedure:
    The Direct Communication Request message can be sent by UR-1 with broadcast mechanism, i.e. to a
    broadcast address associated with the application. The information about V2X Service requesting L2
    link establishment, i.e. information about the announced V2X Service is included in the Direct
    Communication Request message to thaw other UEs to decide on if to respond to the request. The
    Source L2 ID of this message should be the unicast L2 ID of the UE-1.
    The Direct Communication Request message should be transmitted using default AS layer setting e.g.
    broadcast setting, that can be understood by other UEs.
    The UEs that are interested in using the V2X Service announced by the Direct Communication
    Request message can respond to the request (UE-2 and UE-4 in FIG. 6.11.3.1-2). When responding,
    the UE uses the source L2 ID of the received Direct Communication Request message as destination.
    L2 ID in the subsequent signalling to UE-1, and uses its own unicast L2 ID as the source L2 ID. UE-1
    obtains UE-2's L2 ID and UE-4's L2 ID for future communication, for signalling and data traffic.
    After establishing layer 2 link with other UE(s) as described above, new UE(s) can enter proximity
    with UE-1, i.e. UE-1's direct communication range. In this case, UE-1 may initiate V2X Service
    oriented layer 2 link establishment procedure as it is aware of new UE(s) from Application Layer
    messages sent by the UE(s). Or the new UE may initiate V2X Service oriented layer 2 link
    establishment procedure. Therefore UE-1 does not have to keep sending a Direct Communication
    Request message periodically to announce the V2X Service it wants to establish L2 link with other
    UE for unicast.
Regarding the "V2X Service oriented L2 link establishment" introduced above, PC5 resource utilization and
efficiency need to be considered. If several or many UEs are interested in using the V2X Service announced by
UE-1 and want to establish L2 link over PC5 with UE-1, UE-1 has to transmit data traffic to each peer UE after
establishing L2 link with all the UEs sent the Direct Communication Accept message. This means if the number
of peer UEs is 10, UE-1 has to transmit same data traffic 10 times by setting a Destination L2 ID to each peer
UE's L2 ID. This would cause PC5 resource waste problem. In order to resolve this problem, it is proposed to
introduce "V2X Service oriented L2 link establishment for single radio transmission".
"V2X Service oriented L2 link establishment for single radio transmission" operates as below and
FIG. 6.11.3.1-3 shows the procedure:
    Steps 1-2.   These steps are same to steps 1-2 of FIG. 6.11.3.1-2.
    Step 3.      UE-1 (i.e. an initiating UE for V2X Service oriented L2 link establishment) can decide to
                 transmit data traffic in a single radio transmission manner instead of unicast manner if the
                 number of peer UEs (i.e. the UEs sending the Direct Communication Accept message) exceeds the
                 preconfigured threshold.
    Step 4.      For single radio transmission, UE-1 lest each peer UE know a Destination L2 ID
                 used for radio transmission by sending a Single-Tx Communication
                 Request message.
    Step 5.      Each peer UE responds to UE-1 with a Single-Tx Communication Accept
                 message.
Thereafter, UE-1 uses the Single-Tx Destination L2 ID as a Destination L2 ID when sending data
traffic, instead of using each peer UE's L2 ID. Therefore, UE-1 does not have to transmit same data traffic
destined to each peer UE repeatedly which means UE-1 transmits data traffic only one time destined to the
Single-Tx Destination L2 ID.
A UE receiving a Single-Tx Destination L2 ID receives a Step 4 message or transmits a Step 5 message, and
then stores the Single-Tx Destination L2 ID in a context related to L2 link (i.e., unicast link) with UE-1. Then
when a traffic having a Destination L2 ID configured as the Single-Tx Destination L2 ID is received from UE-1,
it may be considered as a traffic corresponding to L2 link configured with UE-1. After transmittung the step 4
message or receiving the step 5 message. UE-1 stores the Single-Tx Destination L2 ID in a context related to L2
link (i.e., unicast link) with peer UEs.

TABLE 10

Alternative/additionally, it may store all information about peer UEs which may use the Single-Tx Destination L2 ID (e.g., Source L2 IDs of peer UEs).
When UE-1 performs single radio transmission, i.e., transmits traffic using the Single-Tx Destination L2 ID, the V2X layer (higher layer of Access Stratum (AS) layer) of UE-1 may indicate, to the AS layer, that this transmission is unicast transmission. Alternatively, it may indicate that this transmission is single radio transmission, multicast transmission, or groupcast transmission.
The single radio transmission mechanism is unidirectional which means the peer UEs of UE-1, i.e. UE-2 to UE-n in FIG. 6.11.3.1-3, use unicast transmission to send user traffic to UE-1. In addition, there is no group concept among these UEs.
The layer 2 link supports the non-IP traffic. No IP address negotiation and allocation procedure would be carried out.
6.11.3.2     Contents of the signalling message for link establishment
The information carried in Direct CommuniGiation Request message defined in TS 24.334 [13] requires at least the following updates:
  For "UE oriented layer 2 link establishment".
    The User Info needs to include the target UE's ID (UE-2's upper layer ID), besides the initiating UE's ID (UE-1's upper layer ID).
 NOTE: Stage 3 can decide if these IDs can be carried in the same IE or separate IEs, for example, the Station ID/Vehicle Temp ID only needs to be 4 octets.
  For "V2X Service oriented layer 2 link establishment".
    The Announced V2X Service Info needs to include the information about V2X Service requesting L2 link establishment, e.g. PSID or ITS-AIDs of the V2X application. Sensor Sharing, and etc can be the case for the V2X Service.
  The IP Address Config, which is specified as mandatory for ProSe, should allow an indication that no IP is to be used, such that the receiving UE (e.g. UE-2) would not start any IP configuration procedure for this particular link.
  The IEs dedicated for security need to be reviewed by SA3, as the security mechanism for eV2X may be different and requires different IEs.
  Additional configuraiton information regarding the link, e.g. when RRC message is used there may be AS layer configurations.
          \* \* \* \* Start of 3rd Change \* \* \* \*
6.11.5      Topics for further study
Following topics need further study:
  whether PC5 Signalling protocol or RRC message should be extended to support unicast communication;

TABLE 11 whether a connection-oriented QoS model should be used for unicast communication;
how to support service announcement for the multicast based services;
whether and how to support L2 ID change during a unicast session.
     \* \* \* \* End of Changes \* \* \* \*

In the description above, the PC 5 operation may be interpreted as including PC5 search (or D2D search, direct discovery, ProSe discovery, sidelink search, or direct search) as well as PC5 communication (or D2D communication, direct communication, ProSe communication, sidelink communication, or direct communication). In addition, it may be interpreted as including all operations using PC5. In V2X, the PC5 operations include, for example, transmitting and receiving a V2X message by a UE over PC5, transmitting and receiving, by a UE, various data generated by a V2X application over PC5, and transmitting and receiving, by a UE, various kinds of information associated with V2X over PC5, establishing, by a UE, a link or a one-to-one connection with another UE over PC5, and searching, by a UE, for another UE over PC5.

In the 5G system as compared with the EPS, the interface name defined for D2D communication may not be PC5. In this case, the present invention may be understood by applying an interface name newly defined for D2D communication. In addition to the PC5 interface, various interfaces (e.g., V1, V2, V3, etc.) conventionally defined in the EPS may be used in the 5G system in the same manner or all or a part thereof may be defined with new names. The invention should be understood considering this point.

In the present invention, a UE may be a vehicle UE, a pedestrian UE, or a UE-type RSU. That is, it includes all devices capable of operating as a UE type or performing the PC5 operation.

In the present invention, the terms V2X service, V2X message, V2X traffic, and V2X data are used interchangeably.

A method for efficiently providing a V2X service through the 5G System (5G mobile communication system, next generation mobile communication system) and the EPS as proposed in the present invention, i.e., the optimized PC5 transmission method for the V2X service is configured by a combination of one or more of the following operations/configuration/steps.

The multicast transmission may be interpreted as groupcast transmission, one-shot transmission to multiple UEs, unicast L2 link with multicast traffic transmission, one-to-one L2 link with multicast traffic transmission, L2 link with multicast traffic transmission, or the like.

Devices to which the Present Invention is Applicable

Figure 19:
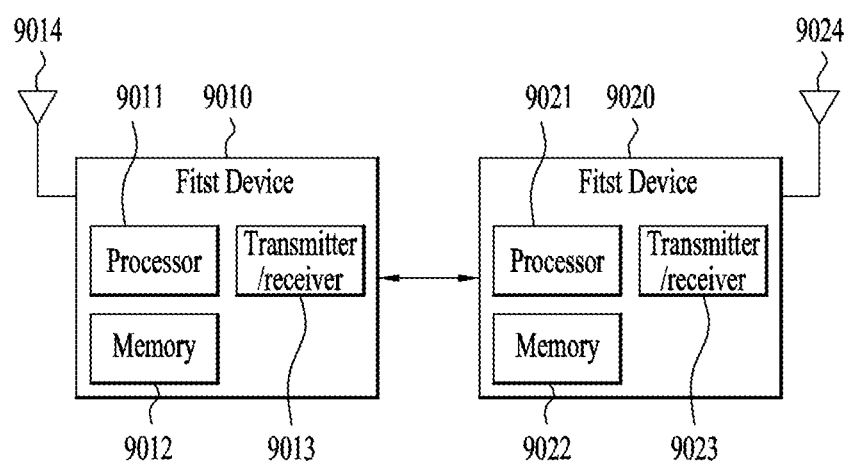
FIG. 19 is a diagram illustrating a configuration of a node device according to an embodiment of the present invention.

Hereinafter, devices to which the present invention is applicable will be described. FIG. 19 is a diagram illustrating a wireless communication apparatus according to an embodiment of the present invention.

Referring to FIG. 19, a wireless communication system may include a first device 9010 and a second device 9020.

The first device 9010 may be a base station, a network node, a transmitting terminal, a receiving terminal, a wireless device, a wireless communication device, a vehicle, a vehicle equipped with an autonomous travel function, a connected car, an unmanned aerial vehicle (UAV), an artificial intelligence (AI) module, a robot, an augmented reality (AR) device, a virtual reality (VR) device, an mixed reality (MR) device, a hologram device, a public safety device, an MTC device, an IoT device, a medical device, a FinTech device (or financial device), a security device, a climate/environmental device, a device related to 5G services, or a device related to the 4th industrial revolution sector.

The second device 9020 may be a base station, a network node, a transmitting terminal, a receiving terminal, a wireless device, a wireless communication device, a vehicle, a vehicle equipped with an autonomous travel function, a connected car, an unmanned aerial vehicle (UAV), an artificial intelligence (AI) module, a robot, an augmented reality (AR) device, a virtual reality (VR) device, an mixed reality (MR) device, a hologram device, a public safety device, an MTC device, an IoT device, a medical device, a FinTech device (or financial device), a security device, a climate/environmental device, a device related to 5G services, or a device related to the 4th industrial revolution sector.

For example, UEs may include a cell phone, a smart phone, a laptop computer, a digital broadcasting terminal, personal digital assistants (PDA), a portable multimedia player (PMP), a navigation device, a slate PC, a tablet, an ultrabook, a wearable device (e.g., a smartwatch, a smart glass, a head mounted display (HMD), etc.). For example, the HMD may be a display device wearable on the head. For example, the HMD may be used to implement VR, AR, or MR.

For example, the UAV may be an airborne vehicle that does not have a person aboard but is controlled to fly by a radio control signal. For example, the VR device may include a device that implements an object or background in a virtual world. For example, the AR device may include a device that implements an object or background of a virtual world by connecting the object or background of the virtual world to a real-world object or background. For example, the MR device may include a device that fuses an object or background of a virtual world with a real-world object or background. For example, the hologram device may include a device that implements a 360-degree stereoscopic image by recording and reproducing stereoscopic information by utilizing the effect of interference of light generated by two laser rays meeting with each other, which is called holography. For example, the public safety device may include a video relay device or a video device that may be worn by a user. For example, the MTC device and the IoT device may be devices that do not require direct human intervention or manipulation. For example, the MTC device and the IoT device may include a smart meter, a vending machine, a thermometer, a smart bulb, a door lock, or various sensors. For example, the medical device may be a device used for the purpose of diagnosing, treating, alleviating, treating, or preventing a disease. For example, the medical device may be a device used for the purpose of diagnosing, treating, alleviating, or correcting an injury or disorder. For example, the medical device may be a device used for the purpose of testing, replacing or modifying a structure or function. For example, the medical device may be a device used for the purpose of controlling pregnancy. For example, the medical device may include a treatment device, a surgical device, an (in vitro) diagnostic device, a hearing aid, or a procedural device. For example, the security device may be a device installed to prevent a risk that may occur and to maintain safety. For example, the security device may be a camera, a CCTV, a recorder, or a black box. For example, the FinTech device may be a device capable of providing financial services such as mobile payment. For example, the FinTech device may include a payment device or a point of sale (POS). For example, the climate/environmental device may include a device for monitoring or predicting the climate/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may implement one or more protocols. For example, the processor 9011 may implement one or more layers of a wireless interface protocol. The memory 9012 may be connected to the processor 9011 and store various types of information and/or instructions. The transceiver 9013 may be connected to the processor 9011 and controlled to transmit and receive wireless signals.

Specifically, the at least one processor of the first device broadcasts a Direct Communication Request message, and receives a Direct Communication Accept message unicast from a second UE that has received the Direct Communication Request message, and the source second UE unicasts data of a V2X service. The source Layer-2 ID included in the broadcast Direct Communication Request message may be used as a destination Layer-2 ID of a Direct Communication Accept message for unicast reception of the data of the V2X service by the second UE.

The second device 9020 may include at least one processor, such as a processor 9021, at least one memory device, such as a memory 9022, and at least one transceiver, such as a transceiver 9023. The processor 9021 may perform the functions, procedures, and/or methods described above. The processor 9021 may implement one or more protocols. For example, the processor 9021 may implement one or more layers of a wireless interface protocol. The memory 9022 may be connected to the processor 9021 and store various types of information and/or instructions. The transceiver 9023 may be connected to the processor 9021 and controlled to transmit and receive wireless signals.

Specifically, the at least one processor of the second device receives a Direct Communication Request message from the first UE in a broadcast manner. The second UE unicasts a Direct Communication Accept message, and receives data of a V2X service from the first UE in a unicast manner. The source Layer-2 ID included in the broadcast Direct Communication Request message may be used as a destination Layer-2 ID of the Direct Communication Accept message for unicast reception of the data of the V2X service by the second UE.

The memory 9012 and/or the memory 9022 may be internally or externally connected to the processor 9011 and/or the processor 9021, or may be connected to other processors through various techniques such as wired or wireless connection.

The first device 9010 and/or the second device 9020 may have one or more antennas. For example, an antenna 9014 and/or an antenna 9024 may be configured to transmit and receive wireless signals.

Configuration of first device 9010 and/or the second device 9020 may be implemented such that the details of various embodiments of the present invention described above can be independently applied or two or more of the embodiments can be simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessor, or the like.

When implemented by firmware or software, a method according to embodiments of the present invention may be implemented by an apparatus, a procedure, or a function that performs the functions or operations described above. Software code may be stored in a memory unit and executed by a processor. The memory unit is located at the interior or exterior of the processor and may transmit and receive data to and from the processor via various known means.

As is apparent from the above description, the present invention has effects as follows.

According to the present invention, it is unnecessary to perform the procedure of link establishment with individual terminals desiring to receive a V2X service after performing broadcast transmission to a plurality of terminals. Accordingly, the operation may be efficient.

It will be appreciated by those skilled in the art that that the effects that can be achieved through the embodiments of the present invention are not limited to those described above and other effects will be clearly understood from the following detailed description.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit and scope of the invention disclosed in the appended claims. Thus, the present invention is not intended to be limited to the embodiments described herein, but is intended to accord with the widest scope corresponding to the principles and novel features disclosed herein.

Although embodiments of the present invention have been described above focusing on the 3GPP system, they are applicable to various mobile communication systems in the same manner.

What is claimed is:

1. A method for transmitting, by a first user equipment (UE), V2X data to a second UE in a wireless communication system, the method comprising:
    broadcasting, by the first UE, a Direct Communication Request message;
    receiving, in a unicast manner, a Direct Communication Accept message from the second UE receiving the Direct Communication Request message; and
    transmitting data of a V2X service to the second UE in a unicast manner,
    wherein a source Layer-2 identity (ID) of the first UE included in the broadcast Direct Communication Request message is used by the second UE as a destination Layer-2 ID of the Direct Communication Accept message for unicast reception of the data of the V2X service by the second UE,
    wherein the Direct Communication Request message includes information regarding a predetermined number of times and a predetermined interval, and
    wherein the Direct Communication Accept message is transmitted based on the second UE receiving the Direct Communication Request message more than the predetermined number of times within the predetermined interval.

2. The method of claim 1, wherein the Direct Communication Request message comprises information about the V2X service.

3. The method of claim 1, wherein the Direct Communication Request message is transmitted for establishment of a V2X service oriented layer 2 link.

4. The method of claim 1, wherein the Direct Communication Accept message corresponds to at least one of a UE that has determined to use the V2X service, a UE that has not determined to use the V2X service but intends to receive data of the V2X service and determine whether to use the V2X service, a UE that has determined to establish an L2 link for the V2X service with the first UE, or a UE that has determined to perform unicast communication with the first UE for the V2X service.

5. A first user equipment (UE) configured to operate in a wireless communication system, the first UE comprising:
    a memory; and
    at least one processor coupled to the memory,
    wherein the at least one processor is configured to, based on executing instructions stored in the memory, control the first UE to:
    broadcast a Direct Communication Request message;
    receive, in a unicast manner, a Direct Communication Accept message from a second UE receiving the Direct Communication Request message; and
    transmit data of a V2X service to the second UE in a unicast manner,
    wherein a source Layer-2 identity (ID) of the first UE included in the broadcast Direct Communication Request message is used by the second UE as a destination Layer-2 ID of the Direct Communication Accept message for unicast reception of the data of the V2X service by the second UE
    wherein the Direct Communication Request message includes information regarding a predetermined number of times and a predetermined interval, and
    wherein the Direct Communication Accept message is transmitted based on the second UE receiving the Direct Communication Request message more than the predetermined number of times within the predetermined interval.

6. The first UE of claim 5, wherein the Direct Communication Request message comprises information about the V2X service.

7. The first UE of claim 5, wherein the Direct Communication Request message is transmitted for establishment of a V2X service oriented layer 2 link.

8. The first UE of claim 5, wherein the Direct Communication Accept message corresponds to at least one of a UE that has determined to use the V2X service, a UE that has not determined to use the V2X service but intends to receive data of the V2X service and determine whether to use the V2X service, a UE that has determined to establish an L2 link for the V2X service with the first UE, or a UE that has determined to perform unicast communication with the first UE for the V2X service.

9. A method for receiving V2X data by a second user equipment (UE) in a wireless communication system, the method comprising:
    receiving, by the second UE, a Direct Communication Request message from a first UE in a broadcast manner;
    transmitting, by the second UE, a Direct Communication Accept message in a unicast manner; and
    receiving data of a V2X service from the first UE in a unicast manner,
    wherein a source Layer-2 identity (ID) of the first UE included in the broadcast Direct Communication Request message is used by the second UE as a destination Layer-2 ID of the Direct Communication Accept message for unicast reception of the data of the V2X service by the second UE wherein the Direct Communication Request message includes information regarding a predetermined number of times and a predetermined interval, and wherein the Direct Communication Accept message is transmitted based on the second UE receiving the Direct Communication Request message more than the predetermined number of times within the predetermined interval.

10. The method of claim 9, wherein the Direct Communication Request message comprises information about the V2X service.

11. The method of claim 9, wherein the Direct Communication Request message is transmitted for establishment of a V2X service oriented layer 2 link.

12. The method of claim 9, wherein the Direct Communication Accept message corresponds to at least one of a UE that has determined to use the V2X service, a UE that has not determined to use the V2X service but intends to receive data of the V2X service and determine whether to use the V2X service, a UE that has determined to establish an L2 link for the V2X service with the first UE, or a UE that has determined to perform unicast communication with the first UE for the V2X service.

13. A second user equipment (UE) configured to operate in a wireless communication system, the second UE comprising:

a memory; and at least one processor coupled to the memory, wherein the at least one processor is configured to, based on executing instructions stored in the memory, control the second UE to:

receive a Direct Communication Request message from a first UE in a broadcast manner;

transmit a Direct Communication Accept message in a unicast manner; and receive data of a V2X service from the first UE in a unicast manner, wherein a source Layer-2 identity (ID) of the first UE included in the broadcast Direct Communication Request message is used by the second UE as a destination Layer-2 ID of the Direct Communication Accept message for unicast reception of the data of the V2X service by the second UE wherein the Direct Communication Request message includes information regarding a predetermined number of times and a predetermined interval, and wherein the Direct Communication Accept message is transmitted based on the second UE receiving the Direct Communication Request message more than the predetermined number of times within the predetermined interval.

* * * * *